(12) United States Patent
Bornkessel et al.

(10) Patent No.: US 11,880,185 B2
(45) Date of Patent: Jan. 23, 2024

(54) SYSTEMS AND METHODS FOR LIQUID DISPENSING SYSTEM COMMUNICATIONS

(71) Applicant: NORDSON CORPORATION, Westlake, OH (US)

(72) Inventors: Andreas Bornkessel, Adendorf (DE); Bernhard Meyer, Scharnebeck (DE); Per Winkelmann, Lüneburg (DE); Hartmut Crull, Lüneburg (DE); Andreas Ehlers, Lüneburg (DE); Scott Means, Duluth, GA (US); Dan Thompson, Duluth, GA (US); James Beal, Duluth, GA (US); Peter Estelle, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 504 days.

(21) Appl. No.: 16/972,034

(22) PCT Filed: Jun. 4, 2019

(86) PCT No.: PCT/US2019/035392
§ 371 (c)(1),
(2) Date: Dec. 4, 2020

(87) PCT Pub. No.: WO2019/236582
PCT Pub. Date: Dec. 12, 2019

(65) Prior Publication Data
US 2021/0240157 A1    Aug. 5, 2021

Related U.S. Application Data

(60) Provisional application No. 62/680,164, filed on Jun. 4, 2018.

(51) Int. Cl.
*G05B 19/409* (2006.01)
*G05B 19/401* (2006.01)
(Continued)

(52) U.S. Cl.
CPC ......... *G05B 19/409* (2013.01); *G05B 19/401* (2013.01); *G05B 19/4155* (2013.01); *G05B 19/4185* (2013.01); *H04L 67/12* (2013.01)

(58) Field of Classification Search
CPC ............... G05B 19/409; G05B 19/401; G05B 19/4155; G05B 19/4185; G05B 19/41845; H04L 67/12; Y02P 90/02
See application file for complete search history.

(56) References Cited

U.S. PATENT DOCUMENTS 9,840,643 B2    12/2017    Baldauf et al.
2004/0124255 A1    7/2004    Heerdt
(Continued)

FOREIGN PATENT DOCUMENTS

EP    1653313 A1    5/2006
EP    2075659 A1    7/2009
(Continued)

*Primary Examiner* — Kim T Nguyen
(74) *Attorney, Agent, or Firm* — BakerHostetler

(57) ABSTRACT

Systems and methods for improved liquid dispensing system communications are disclosed. In an example method for communicating control data between a plurality of component of a liquid dispensing system, a controller of a first component of a liquid dispensing system publishes a control data message to a composite controller associated with the plurality of component. Based on a classification of the control data message, a second component is determined to be a subscriber for the control data message. The composite controller then transmits the control data message to a controller of the second component.

45 Claims, 20 Drawing Sheets

(51) Int. Cl.
*G05B 19/4155* (2006.01)
*G05B 19/418* (2006.01)
*H04L 67/12* (2022.01)

(56) References Cited

U.S. PATENT DOCUMENTS

| | | |
|---|---|---|
| 2009/0285983 A1 | 11/2009 | Baldauf et al. |
| 2010/0287879 A1 | 11/2010 | Donati et al. |
| 2011/0245983 A1 | 10/2011 | Beebe |
| 2013/0178969 A1 | 7/2013 | Zanichelli et al. |
| 2015/0185723 A1 | 7/2015 | Noguchi |
| 2015/0378371 A1 | 12/2015 | Ange et al. |
| 2016/0008834 A1 | 1/2016 | Brudevold et al. |
| 2016/0052007 A1* | 2/2016 | Fuller .................... A45D 34/00 222/638 |
| 2017/0239840 A1* | 8/2017 | Adams ................. G05D 11/137 |
| 2017/0277205 A1* | 9/2017 | Tix ....................... G05D 7/0635 |
| 2020/0366513 A1 | 11/2020 | Yoneda et al. |

FOREIGN PATENT DOCUMENTS

| | | |
|---|---|---|
| EP | 2444867 A1 | 4/2012 |
| EP | 2684614 A1 | 1/2014 |
| EP | 2054785 B1 | 3/2014 |
| JP | 2011-508327 A | 3/2011 |
| JP | 2014-501206 A | 1/2014 |
| JP | 2014-018799 A | 2/2014 |
| JP | 2015-125746 A | 7/2015 |
| JP | 2019-080164 A | 5/2019 |
| WO | 2005/045536 A2 | 5/2005 |
| WO | 2008/075631 A1 | 6/2008 |
| WO | 2017/099772 A1 | 6/2017 |
| WO | 2018/008187 A1 | 1/2018 |

* cited by examiner

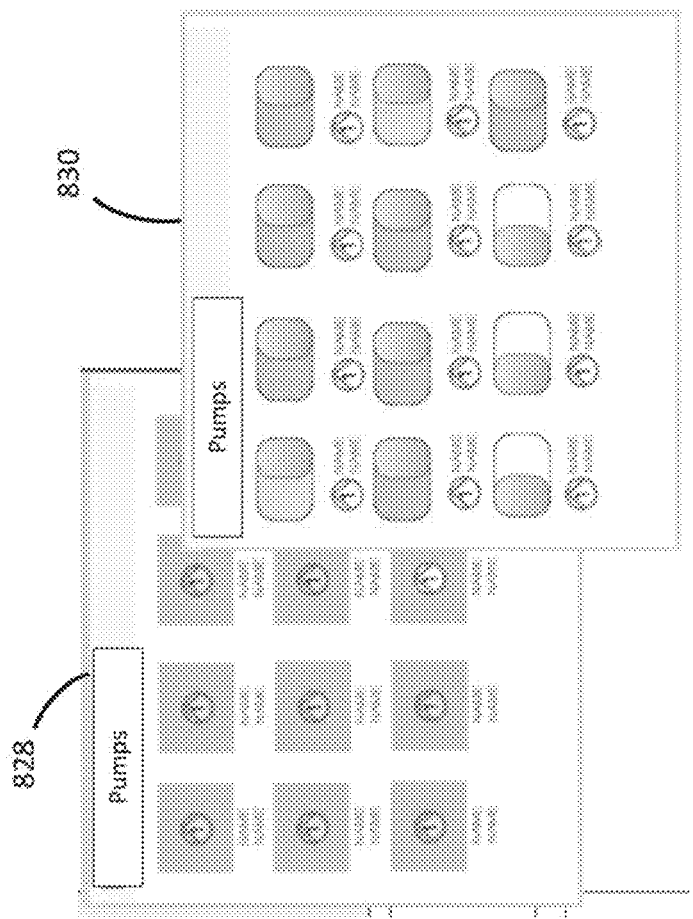
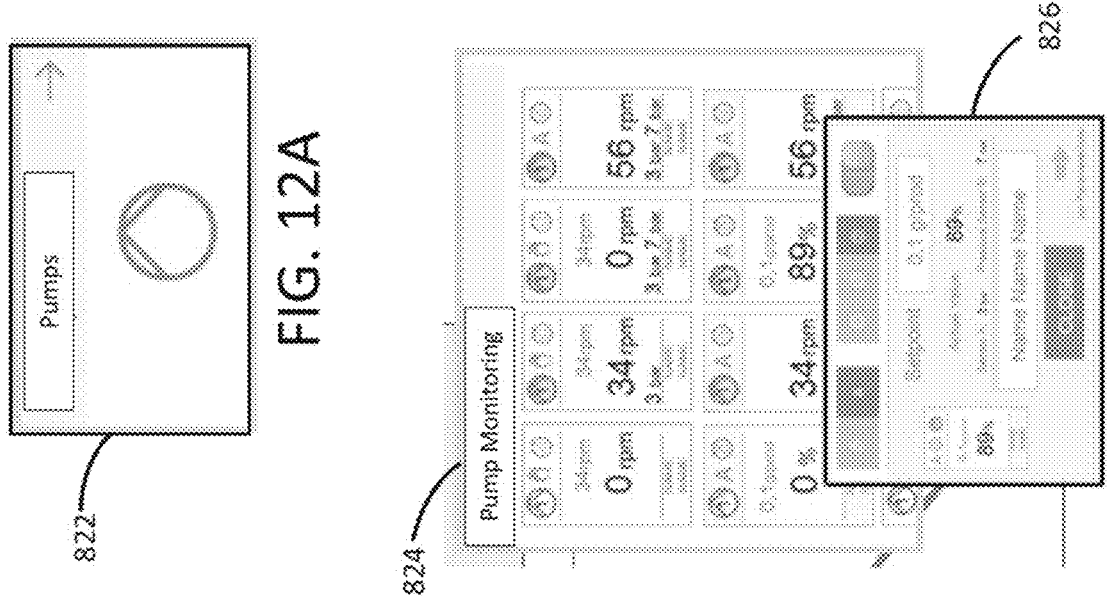
FIG. 12A
FIG. 12B
FIG. 12C

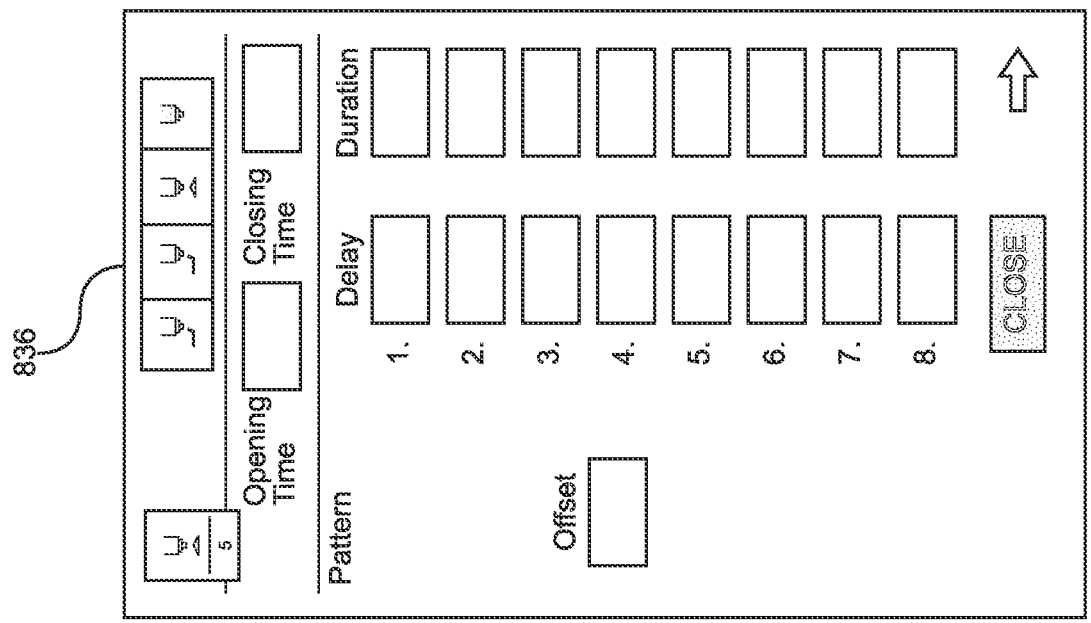
FIG. 13C
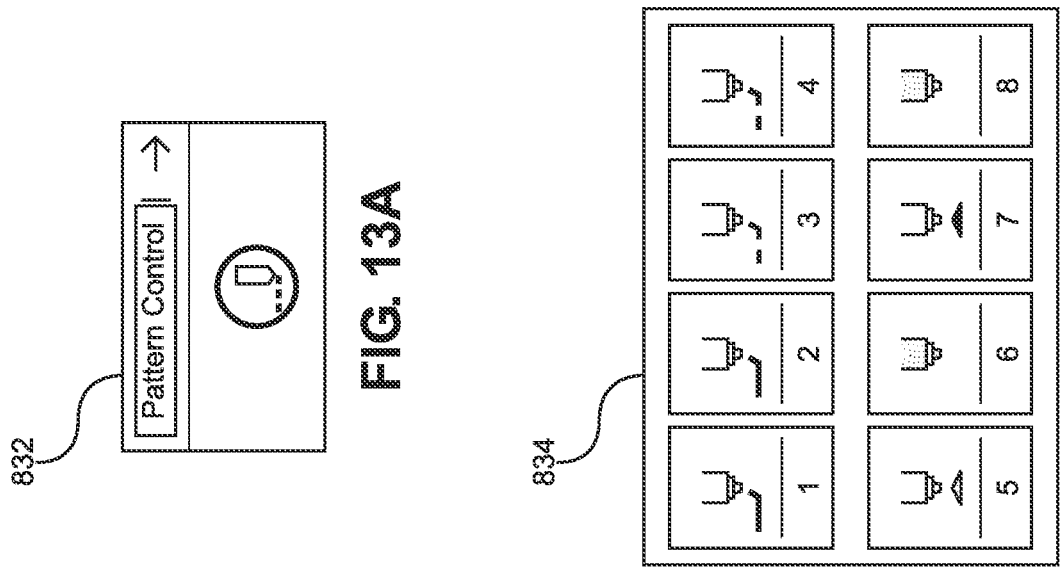
FIG. 13A
FIG. 13B

SYSTEMS AND METHODS FOR LIQUID DISPENSING SYSTEM COMMUNICATIONS

CROSS REFERENCE TO RELATED APPLICATIONS

This application is a National Stage Application of International Patent App. No. PCT/US2019/035392, filed Jun. 4, 2019, which claims the benefit of U.S. Provisional Patent App. No. 62/680,164, filed Jun. 4, 2018, the entire disclosures of which are hereby incorporated by reference as if set forth in their entirety herein.

TECHNICAL FIELD

This disclosure relates generally to liquid dispensing and, more particularly, to systems and methods for improved liquid dispensing system communications.

BACKGROUND

Liquid dispensing systems find use in a variety of applications. For example, such a system may apply hot melt adhesives during the manufacture of disposable hygiene products. As another example, a hot melt liquid dispensing system may apply hot melt adhesive to assemble various types of packaging, such as paper-based packaging for food and beverages. Hot melt adhesives used in such applications may include moisture curing hot-melt polyurethane adhesives ("hot-melt PURs"), which are often used where a stable surface-to-surface bond must be formed. Other conventional hot melt adhesives may be used in securing a variety of both similar and dissimilar materials together in a mating relationship, such as wood, plastics, corrugated films, paper, carton stocks, metals, rigid polyvinylchlorides (PVCs), fabrics, leathers, and others. Hot melt adhesives may be especially useful in applications where it is desirable to have the adhesive solidify rapidly after being melted and dispensed.

In an example configuration of a hot melt liquid dispensing system, hot melt adhesive in a solid or semi-solid form is provided to one or more melters or melter units. A melter heats the solid or semi-solid hot melt adhesive until it reaches a molten state. The molten hot melt adhesive may be then pumped to one or more applicators (also referred to as applicator modules, dispensers, or the like). The applicators thereby dispense the melted hot melt adhesive to the desired surface or substrate, often as a series of dots or lines. It is most always crucial, however, that the adhesive be applied within narrow positioning, timing, and volume tolerances. For example, an insufficient volume of dispensed adhesive may result in ineffective bonds while an excessive volume of adhesive may result in not only wasted material but also undesirable flow once the adhesive is applied to a surface.

Proper operation of the melter(s) within the hot melt liquid dispensing system is one important factor in achieving the necessary dispensing results. For example, hot melt adhesive temperature affects hot melt adhesive viscosity. The viscosity of the hot melt adhesive, in turn, affects the volume of hot melt adhesive that is dispensed during each adhesive application, particularly when the hot melt adhesive is pressure driven. Yet a host of operating parameters, settings, data measurements, hardware configuration, etc. must be carefully managed to ensure optimal melter performance. Clearly then, effectively managing these many parameters presents challenges.

Further complicating these challenges, a hot melt liquid dispensing system often includes multiple melters supporting a production line containing multiple applicators or a production line may be supported by multiple hot melt liquid dispensing systems that each include one or more melters. In addition, a plant or production facility may have multiple production lines operating simultaneously, each associated with a separate hot melt liquid dispensing system which, in turn, comprises one or more melters.

These and other shortcomings are addressed in the present disclosure.

SUMMARY

Disclosed herein are systems and methods for improved liquid dispensing system communications. In an example method for communicating control data between a plurality of components of a liquid dispensing system, a controller of a first component of a liquid dispensing system publishes a control data message to a composite controller associated with the plurality of component. Based on a classification of the control data message, a second component is determined to be a subscriber for the control data message. The composite controller then transmits the control data message to a controller of the second component.

In another example method for adding a liquid dispensing system component to a composite system comprising a composite controller and a plurality of liquid dispensing systems, the composite controller detects a signal from the liquid dispensing system component. Responsive to detecting the signal, configuration data associated with the liquid dispensing system component is requested. The configuration data is received from the liquid dispensing system component. Based on the configuration data, the liquid dispensing system component is added to the composite system by the composite controller.

An example device is configured for controlling a plurality of components of a liquid dispensing system. The device comprises a screen configured to output a user interface. The user interface comprises an interface element configured for selection of a component of the plurality of components. The user interface further comprises a plurality of simultaneously-displayed control tiles associated with a selected component. The device further comprises a communications interface configured to receive control data from the selected component. At least a portion of the control data is displayed via the plurality of control tiles.

In an example method for controlling a liquid dispensing system, a location of a control device, relative to a component of the liquid dispensing system, is determined. The control device is configured to control, at least in part, the liquid dispensing system. The control device outputs a user interface configured to display control data associated with the liquid dispensing system. Based on the location of the control device, at least one of a display of the control data via the user interface and a modification of the control data via the user interface is managed.

An example control system for a liquid dispensing system comprises a control device configured to output a user interface. The user interface is configured to display control data associated with a component of the liquid dispensing system. The control system further comprises a wireless beacon device configured to communicate with the control device. The control device is configured to manage, based on a location of the control device relative to the component of the liquid dispensing system, at least one of a display of the control data via the user interface and a modification of the control data via the user interface

BRIEF DESCRIPTION OF DRAWINGS

The accompanying drawings, which are incorporated in and constitute a part of this specification, illustrate embodiments and together with the description, serve to explain the principles of the methods and systems:

FIGS. 10A through 17C illustrate example diagrams of user interface elements;

Aspects of the disclosure will now be described in detail with reference to the drawings, wherein like reference numbers refer to like elements throughout, unless specified otherwise.

DETAILED DESCRIPTION

The systems and methods of the present disclosure relate to improved liquid dispensing system communications. Although reference shall be made primarily to hot melt adhesive, the techniques described herein may be applicable to any sort of liquid, including non-adhesives.

Figure 1:
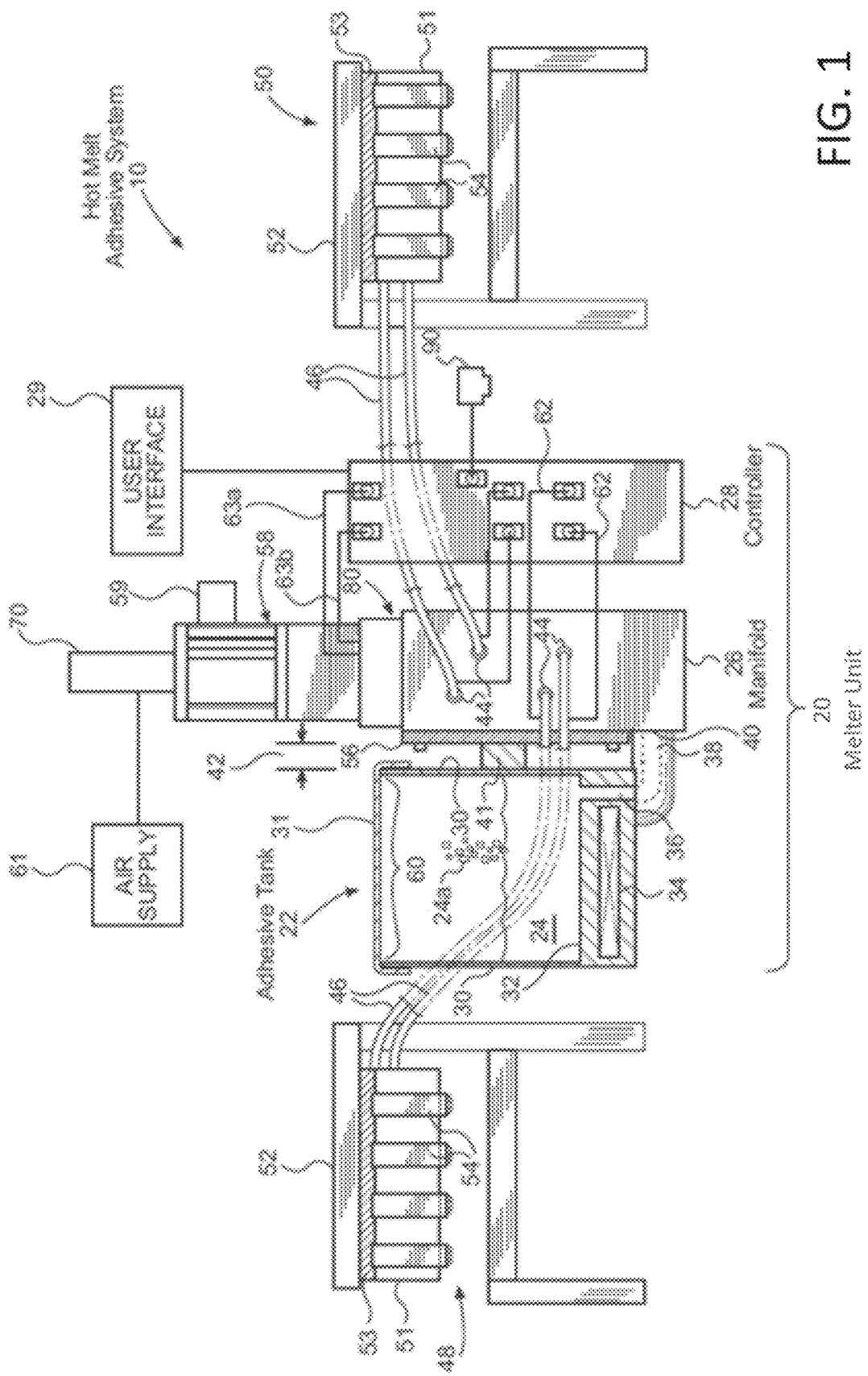
FIG. 1 illustrates an example dispensing system.

FIG. 1 illustrates an example liquid dispensing system 10 (e.g., a hot melt adhesive dispensing system or other type of liquid dispensing system) with which the techniques described herein may be implemented. The liquid dispensing system 10 comprises a melter unit 20 that includes an adhesive supply 22 for receiving and melting solid or semi-solid adhesive 24a, such as pellets, a manifold 26 connected to the adhesive supply 22, a controller 28, and a user interface 29. The adhesive supply 22 may be a tank-style melter, or a grid and reservoir melter, among others. Upon melting, the solid or semi-solid adhesive 24a stored in the adhesive supply 22 transforms into a liquid adhesive 24. The adhesive supply 22 comprises side walls 30, a removable cover 31, and a base 32 which includes one or more adhesive supply heaters 34 for melting and heating the adhesive 24a and the liquid adhesive 24 in the adhesive supply 22. An adhesive supply outlet 36 proximate the base 32 is coupled to a passage 38 which connects to an inlet 40 of the manifold 26.

A positive-displacement pump 58, such as a vertically-oriented piston pump (as shown) or a gear pump, is coupled to the manifold 26 for pumping liquid adhesive 24 from the adhesive supply 22 into the manifold 26, where it is split into separate flows. A pump motor 59 drives the pump 58. By operation of the pump 58 (and thus also as a function of the pump motor 59), the adhesive is supplied to the manifold 26 and applicators 48, 50 under pressure. Such pressure may affect the volume of adhesive that is dispensed in one applicator cycle (also referred to as a gun cycle) of an adhesive dispensing module 54, as well as generally the flow volume and flow rate of adhesive into, through, and/or out of the manifold 26.

The manifold 26 is mounted to a side wall 30 of the adhesive supply 22 with a spacer 41 and is spaced from the adhesive supply 22 a distance 42 sufficient to provide thermal isolation of the adhesive supply 22 from the manifold 26. The manifold 26 includes a plurality of outlet ports 44 which may be fitted with heated hoses 46 attached to one or more adhesive applicators 48, 50 to supply the liquid adhesive 24 to the applicators 48, 50. The manifold 26 may include a manifold heater 56 which is separate from the adhesive supply heater 34 and which can be independently controlled by the controller 28. In some embodiments, a single heater can be used for heating the adhesive supply 22 and the manifold 26. While FIG. 1 shows the adhesive supply 22 in close physical proximity to the manifold 26, other arrangements are also possible where the source of adhesive is physically distant from the manifold. In such arrangements, more than one pump may be used to move adhesive from the adhesive supply 22 toward the ultimate point of application.

The manifold 26 may create a plurality of flow streams that are carried by the corresponding heated hoses 46 to the applicators 48, 50. The hoses 46 are electrically coupled to the controller 28 by cord sets 62 associated with each hose 46. The applicators 48, 50 include one or more adhesive dispensing modules 54 configured to dispense/apply the liquid adhesive 24 to a product, such as a carton, package, or other object. The adhesive dispensing modules 54 are mounted to applicator bodies 51 having applicator heaters 53 and are supported on a frame 52. The liquid dispensing system 10 includes two applicators 48, 50, with one applicator located on each side of the melter unit 20 as shown in FIG. 1, although other implementations of the liquid dispensing system 10 may use a different number of applicators, dispensing modules, and other configurations. For example, the applicators 48, 50 may be each configured with a single adhesive dispensing module 54 or may be each configured with a pair of adhesive dispensing modules 54. The adhesive dispensing modules 54 of an applicator 48, 50 may be commonly monitored, controlled, and actuated by a common air supply. Alternatively, the adhesive dispensing modules 54 of an applicator 48, 50 may be independently monitored, controlled, and actuated by separate air supplies. An applicator 48, 50 and/or an adhesive dispensing module 54 may be variously referred to as an applicator or dispenser.

The pump 58 is located external to the adhesive supply 22 and is connected to an air pressure regulator 70 that receives air from an air supply 61. More particularly, the air pressure regulator 70 is mounted to the melter unit 20 and connects to the air supply 61. In some implementations, the pump 58 may be attached to the manifold 26 and heated by the manifold heater 56. This arrangement permits a larger tank opening 60, increases the tank capacity, and reduces the time required to heat the pump 58. Further, a flow meter 80 may be attached to the manifold 26 to measure adhesive flow therethrough. The flow meter 80 comprises a pair of sensors that are electrically coupled to the controller 28 by respective cords 63a, 63b associated with each sensor. At least one product detector 90, such as a photo-sensor, is also electrically coupled to the controller 28.

The melter unit 20 includes the controller 28. The controller 28 houses the power supply and electronic controls for the liquid dispensing system 10. The controller 28 may be configured with one or more processors and memory configured to store instructions that, when executed by the one or more processors, cause the controller 28 to effectuate various operations described herein. The controller 28 may be configured to manage various types of data associated with the liquid dispensing system 10 and components thereof, including the melter unit 20, the applicators 48, 50, and the controller 28 itself. Managing such data may include storing the data, capturing the data (e.g., measured by various sensors), modifying or setting the data, receiving like data from other controllers 28 of other melter units 20 or liquid dispensing systems 10, and providing the data to other controllers 28 of other melter units 20 or liquid dispensing systems 10 (e.g., via a composite controller or cloud system).

Data managed by the controller 28 (collectively referred to as control data) may include operating parameters, measured data, and hardware configuration data. Example operating parameters may relate to temperature setpoint, control loop settings (e.g., temperature control loop), control loop type, pump speed, melter duty cycle (or individual heaters thereof), applicator cycle rate, and pump or pump motor speed. Example measured data may relate to liquid temperatures (including at various points within melter unit 20, the tank 22, the manifold 26, the applicators 48, 50, and the heated hoses), liquid flow rate (e.g., from the manifold 26), liquid flow volume (e.g., from the manifold 26), and liquid pressure. Example hardware configuration data may include the number of pumps, the types of pump(s), the holding capacity of the tank 22, the number of hose outlets of the manifold 26, the power capacity, the control interfaces to and from the controller 28, the weight (e.g., of the melter unit 20), the external dimensions (e.g., of the melter unit 20), the liquid throughput from the melter unit 20, and the melt rate of the melter unit 20.

With respect to the heating features of the liquid dispensing system 10, the controller 28 is electrically coupled to the heaters, including the adhesive supply heater 34, the manifold heater 56, and the applicator heaters 53, as well as any hose heaters. The controller 28 may also be coupled with various temperature sensors in the liquid dispensing system 10, which may be associated with or included in the adhesive supply heater 34, the manifold heater 56, the applicator heaters 53, and any hose heaters. The controller 28 independently monitors and adjusts the adhesive supply heater 34, the manifold heater 56, the applicator heaters 53, and any hose heaters, to melt solid or semi-solid adhesive 24a received in the adhesive supply 22 and to maintain the temperature of (melted) adhesive 24 to ensure proper viscosity of the adhesive 24 supplied to the applicators 48, 50 and dispensed by the adhesive dispensing modules 54.

Figure 2:
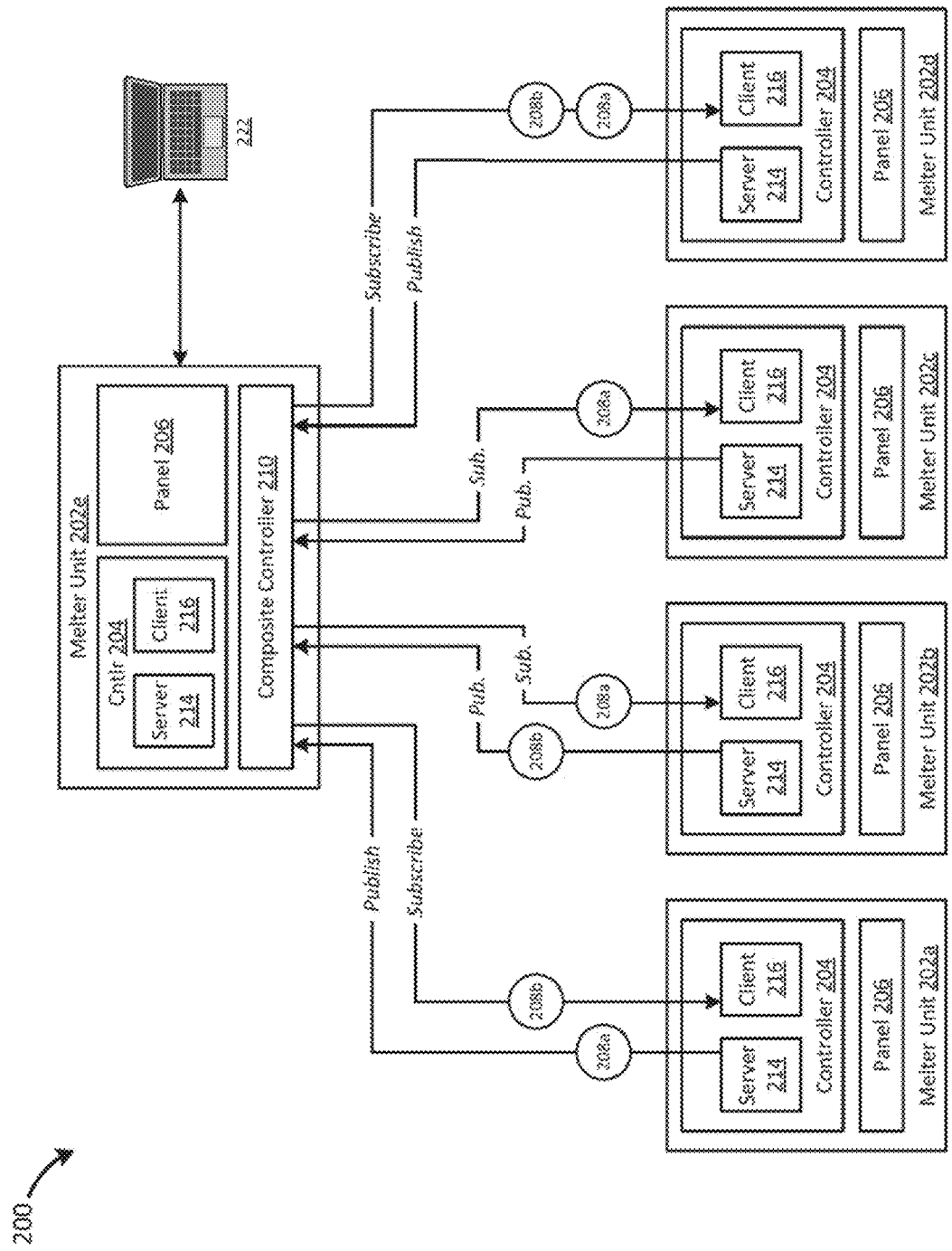
FIG. 2 illustrates an example schematic diagram of a composite system.

FIG. 2 illustrates a schematic diagram of a composite system 200 comprising a plurality of melter units 202a-e at a production facility. Although melter units 202a-e are shown in FIG. 2, any other component of the liquid dispensing system 10 or a plurality of the liquid dispensing systems 10 may be used to control data flow as described below. Data flow within the system 200 may be performed according to a publish/subscribe communication model or architecture, such as the OPC Unified Architecture (OPC/UA). In particular, control data is published by a melter unit 202 to a composite controller 210. The control data published to the composite controller 210 is propagated by the composite controller 210 to select melter units 202 via subscription. As shown in FIG. 2, the composite controller 210 is implemented as part of the melter unit 202e. Alternatively, the composite controller 210 may be implemented as a stand-alone unit co-located with the melter units 202a-e. As a further alternative, the composite controller 210 may be implemented as a cloud system, as will be discussed with respect to FIG. 3.

The melter units may be referred to generically as melter units 202 or melter unit 202 or the melter units may be referred to specifically as one of the particular melter units 202a-e, as appropriate. The system 200 may be referred to as a composite system. The system 200 may represent a single liquid (e.g., adhesive) dispensing system (e.g., the liquid dispensing system 10 of FIG. 1) configured with multiple melter units 202 or other components. The system 200 alternatively may represent multiple liquid dispensing systems each having a single melter unit 202. For example, the melter unit 202a may belong to a first liquid dispensing system, the melter unit 202b may belong to a second liquid dispensing system, and so forth. Yet further, the system 200 may comprise a combination thereof in which some melter units 202 all belong to a common liquid dispensing system while other melter units 202 each belong to separate single-melter-unit liquid dispensing systems. Although the system 200 is generally discussed with respect to melter units 202, the techniques described herein may be applied to other components of a liquid dispensing system, such as an applicator or sub-components of a melter unit 202 (e.g., a manifold, adhesive tank, hose, etc.).

Each melter unit 202 comprises a controller 204. The controller 204 of a melter unit 202 may generally control operations of the melter unit 202 and communications to and from the melter unit 202. In some instances, the controller 204 may additionally control operations of at least some aspects of the liquid dispensing system associated with the melter unit 202. The controller 204 may further manage control data stored at the controller 204, including receiving control data, modifying control data, and transmitting control data to other systems. For example, the controller 204 may receive control data from the composite controller 210 as a subscriber. Conversely, the controller 204 may transmit control data to the composite controller 210 as a publisher. Control data may include operating parameters, measured data, and hardware configuration. The controller 204 may be the same as or similar to the controller 28 of FIG. 1. The controller 204 may comprise an OPC Unified Architecture (OPC/UA) controller.

Each controller 204 is configured with a server 214 and a client 216. The server 214 and the client 216 may be implemented as part of the controller 204. Additionally or alternatively, the server 214 and the client 216 may be implemented, at least in part, as separate physical components. The server 214 and the client 216 may be considered as an embedded server and embedded client, respectively, of the melter unit 202 and/or its controller 204. The server 214 may comprise an embedded OPC/UA server and the client 216 may comprise an embedded OPC/US client. The server 214 is generally configured to publish control data (i.e., control data messages) to the composite controller 210. The client 216 is generally configured to subscribe to and receive published control data (i.e., control data messages) from the composite controller 210. The server 214 may be regarded as the publisher and the client 216 may be regarded as the subscriber in the publish-subscribe architecture of the system 200.

As indicated, the melter unit 202e comprises the composite controller 210. The composite controller 210 is configured to coordinate and direct various control data messages to and from the melter units 202, in particular the controllers 204 of the melter units 202 (including the controller 204 of the melter unit 202e itself). For example, the composite controller 210 may receive a published control data message from a server 214 of a melter unit 202 and send the control data message to the client 216 of one or more other melter units 202 according to subscription criteria. The composite controller 210 may act as a message broker for the control data messages in some aspects.

The composite controller 210 may filter the published control data messages to determine which, if any, of the melter units 202 should receive the published control data messages. The composite controller 210 may filter the published control data messages according to one or more classifications of the control data messages. In some aspects, the classification (or class) of a published control data message may be defined, at least in part, by the publishing server 214. The composite controller 210 may filter the published control data messages further based on subscription profiles (e.g., subscription criteria) associated with other melter units 202. A melter unit 202 may define, at least in part, the subscription profile associated with the melter unit 202. Filtering by the composite controller 210 may be done according to a topic-based model, a content-based model, or a combination thereof.

In the topic-based model, classifications may be with respect to a type of component (e.g., pump, heater, adhesive tank, applicator, manifold, heated hoses, controller, etc.) associated with the control data. Classifications further may be with respect to a type of operating parameter (e.g., temperature setpoint, applicator cycle rate, melter/heater duty cycle, control loop settings, control loop type, pump speed, etc.) associated with the control data. Classifications further may be with respect to a type of measured data (e.g., adhesive temperature, adhesive flow rate, adhesive flow volume, and adhesive pressure) indicated in the control data. Classifications further may be with respect to a type of hardware configuration data (e.g., a number of pumps, types of pump(s), a holding capacity of an adhesive tank, a number of hose outlets of a manifold, a power capacity, control interfaces to and from a controller, a melter unit weight, external dimensions of a melter unit, an adhesive throughput from a melter unit, and a melt rate of a melter unit) indicated in the control data. A classification may be further based on the type of data in general: e.g., operating parameter data, measured data, or hardware configuration data.

In a content-based classification model, classifications may be with respect to the particular melter unit 202 that published the control data. Classification may be further with respect to a value of an operating parameters or measured data. For example, classification may be based on an operating parameter or measured data value exceeding a threshold, being below a threshold, being outside of a threshold range, or being within a threshold range. For instance, control data from one melter unit 202 indicating an adhesive temperature may be sent by the composite controller 210 to other melter units 202 based on the composite controller 210 determining that the adhesive temperature value is outside of a threshold range.

The melter unit 202e comprising the composite controller 210 is configured with a panel 206, which is also referred to as a control panel. One or more of the other melter units 202 may be also configured with a panel 206. A panel 206 may comprise a display (e.g., an LCD or LED display) and one or more user inputs (e.g., a pointing device, a keyboard, or various control buttons). The display may be configured as a touchscreen display for user input. The panel 206 may output a graphical user interface configured to display a visual layout of the melter units 202 and other components/ units of the system 200. The graphical user interface may be also configured with one or more interface elements (e.g., "tiles") to display various data associated with a dispensing system. An interface element may be additionally or alternatively associated with a melter unit 202 or other component/unit of the system 200. Upon activation of an interface element for a particular liquid dispensing system, data relating to that dispensing system may be displayed, such the dispensing system's operating parameters, various measured data, and/or aspects of the dispensing system's hardware configuration. The graphical user interface may be also used to input various changes to the liquid dispensing system and other components of the system 200. For example, an operator may use the graphical user interface and the panel 206 generally to modify an operating parameter of a liquid dispensing system.

The melter unit 202e (the composite controller 210 in particular) may be configured for mutual communication with a computing device 222. The computing device 222 may be in communication with the melter unit 202e via a wired connection or a wireless connection. For example, the computing device 222 may be in communication with the computing device 222 via a WAN (wide area network), a LAN (local area network), a WLAN (wireless LAN), an intranet, or the Internet. The computing device 222 may be located at the same production facility as the melter units 202. For example, an operator may move through the floor of a production facility with a portable computing device 222 to monitor and manage the production operations. Additionally or alternatively, the computing device 222 may be located remote from a production facility. As some examples, the computing device 222 may be a personal computer (PC), a laptop computer, a mobile device, a tablet computer, or a smartphone. The computing device 222 may be configured to perform similar functions as the panel 206 of the melter unit 202e. In some aspects, the melter unit 202e may be configured without the panel 206 and the panel 206 functionality may be instead transferred to the computing device 222.

First and second control data messages 208a, 208b illustrate example publish/subscribe data flows within the system 200. With regard to the first control data message 208a, the server 214 of the melter unit 202a generates the first control data message 208a and publishes this to the composite controller 210. The composite controller 210 filters the first control data message 208a according to subscription profiles associated with the other melter units 202 and aspects of the first control data message 208a. Aspects of the first control data message 208a may comprise one or more classifications of the first control data message 208a. Such classification(s) may have been defined by the server 214 of the melter unit 202a. In this example, the first control data message 208a indicates a heater duty cycle of the melter unit 202a. The subscription profiles associated with the melter units 202b, 202c, 202d indicate that these melter units 202b, 202c, 202d should receive control data from other melter units 202 relating to heater duty cycle (e.g., a classification of the first control data message 208a). Additionally or alternatively, the subscription profiles associated with the melter units 202b, 202c, 202d may indicate that these melter units 202b, 202c, 202d should receive control data published by the melter unit 202a (e.g., an additional or alternative classification of the first control data message 208a). In either or both cases, the first control data message 208a is sent via subscription to the respective clients 216 of the melter units 202b, 202c, 202d.

With regard to the second control data message 208b, the server 214 of the melter unit 202b generates the second control data message 208b and publishes this to the composite controller 210. The composite controller 210 filters the second control data message 208b according to subscription profiles associated with the other melter units 202 and aspects of the second control data message 208b (e.g., one or more classifications of the second control data message 208b). In this example, the second control data message 208b indicates a temperature setpoint operating parameter of the melter unit 202b. The subscription profiles associated with the melter units 202a, 202d indicate that these melter units 202a, 202d should receive control data from other melter units 202 relating to temperature setpoint operating parameters (e.g., a classification of the second control data message 208b). Accordingly, the composite controller 210 sends the second control data message 208b via subscription to the respective clients 216 of the melter units 202a, 202d. Further to this example, the subscription profiles associated with the melter units 202c, 202e may indicate that these melter units 202c, 202e should only receive control data associated with temperature setpoint operating parameters if the temperature setpoint operating parameter is outside of a threshold range (e.g., another classification of the second control data message 208b). The temperature setpoint operating parameter indicated in the second control data message 208b is not outside of the threshold range. Therefore, the melter units 202c, 202e are not sent the second control data message 208b.

The composite controller 210 may be also configured to coordinate as least some operations of the melter units 202. For example, the composite controller 210 may receive control data from one melter unit 202 and direct a second melter unit 202 to operate accordingly. For instance, the composite controller 210 may receive control data indicating that the first melter unit 202 is inoperable or suffers from reduced melted adhesive output. The composite controller 210 may therefore direct the second melter unit 202 to increase its melted adhesive output to compensate.

Figure 3:
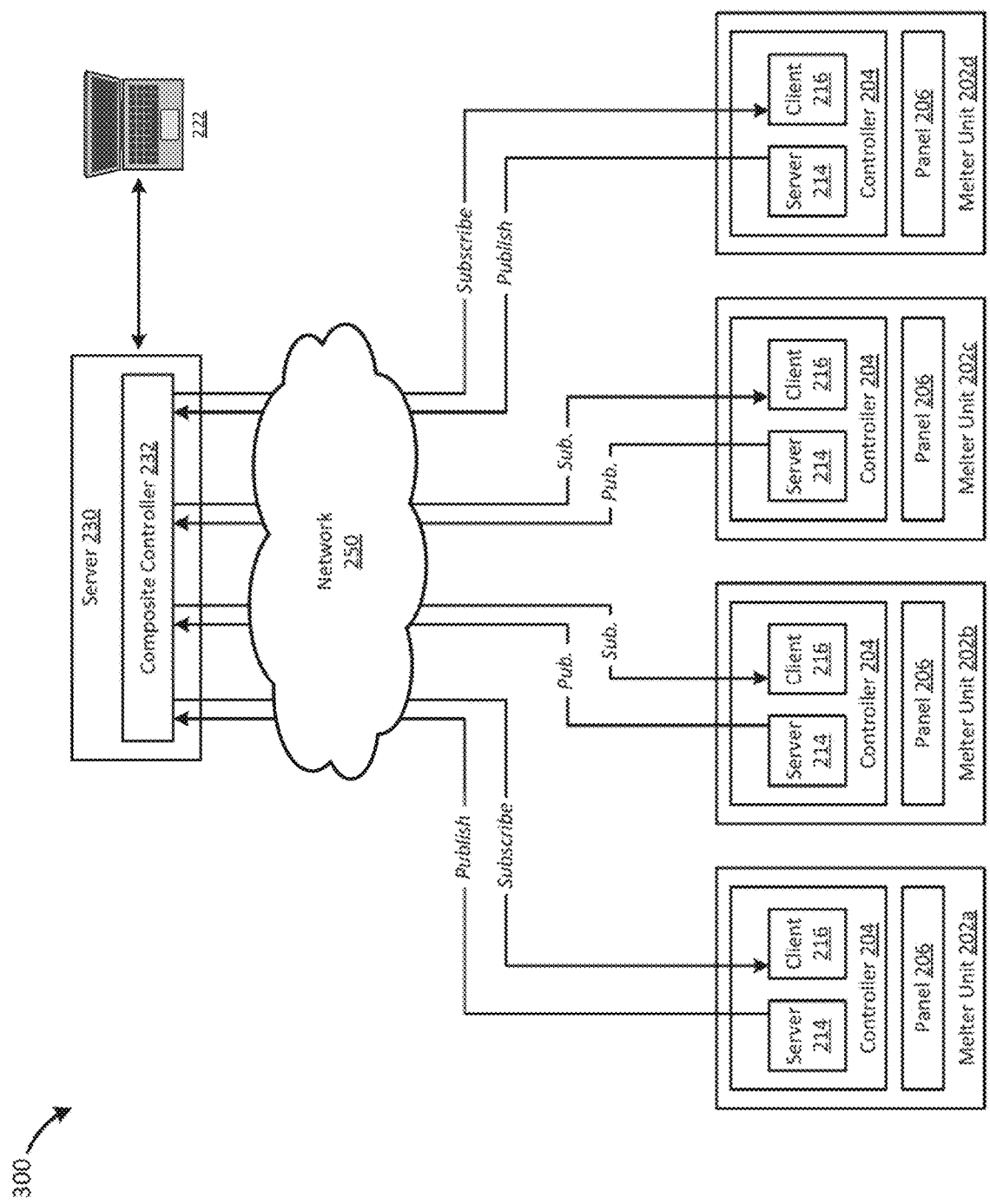
FIG. 3 illustrates an example schematic diagram of another composite system.

FIG. 3 illustrates a schematic diagram of a system 300 configured according to a cloud/edge architecture. The system 300 may be similar in at least some aspects to the system 200 of FIG. 2. Accordingly, like reference characters indicate like components or parts. Yet instead of a composite controller being implemented as part of a melter unit 202, as is the case with the system 200 in FIG. 2, a composite controller 232 is implemented by a server 230. The server 230 may be part of a cloud/edge system and the melter units 202 may communicate with the server 230 via a network 250. As such, the server 230 may be located remote from the production facility housing the melter units 202, although the disclosure is not so limited. For example, the server 230 may be located at the same production facility as the melter units 202 and connect to the melter units 202 via a LAN (e.g., WLAN) at the production facility. The server 230 is not limited to a single computing device, but may comprise multiple networked computing devices, storage units (e.g., databases), and/or networking devices.

The composite controller 232 implemented at the server 230 may be similar in at least some aspects to the composite controller 210 of FIG. 2. Indeed, the composite controller 232 may be considered analogous to the composite controller 210 in many aspects of functionality. For example, like the composite controller 210, the composite controller 232 may receive published control data messages from the servers 214 of the melter units 202. The composite controller 232 may filter the control data messages according to subscription profiles associated with the melter units 202 and aspects of the control data itself. The composite controller 232 may thereby transmit the control data message to the clients 216 of the determined melter units 202 (or none at all).

A computing device 222 may communicate with the server 230 and in particular the composite controller 232. The computing device 222 may implement at least some of the functionality provided by the panel 206 of the melter unit 202e in FIG. 2. For example, the computing device 222 may display a graphical user interface providing a visual layout of the liquid dispensing systems and other components within the production facility. The graphical user interface may display various data relating to the liquid dispensing systems, such as operating parameters, measured data, and hardware configuration data. The data displayed by the graphical user interface may be derived from control data messages published by or otherwise received from the melter units 202. The graphical user interface may provide various interactive interface elements ("tiles") that may be activated to display further data of a liquid dispensing system associated with the interface element. The graphical user interface, and the computing device 222 generally, may be used to control various aspects of a liquid dispensing system and other components of the system. For example, the computing device 222 may be used to adjust various operating parameters of a liquid dispensing system. Such control may be effectuated via the server 230 and/or the composite controller 232.

Figure 4:
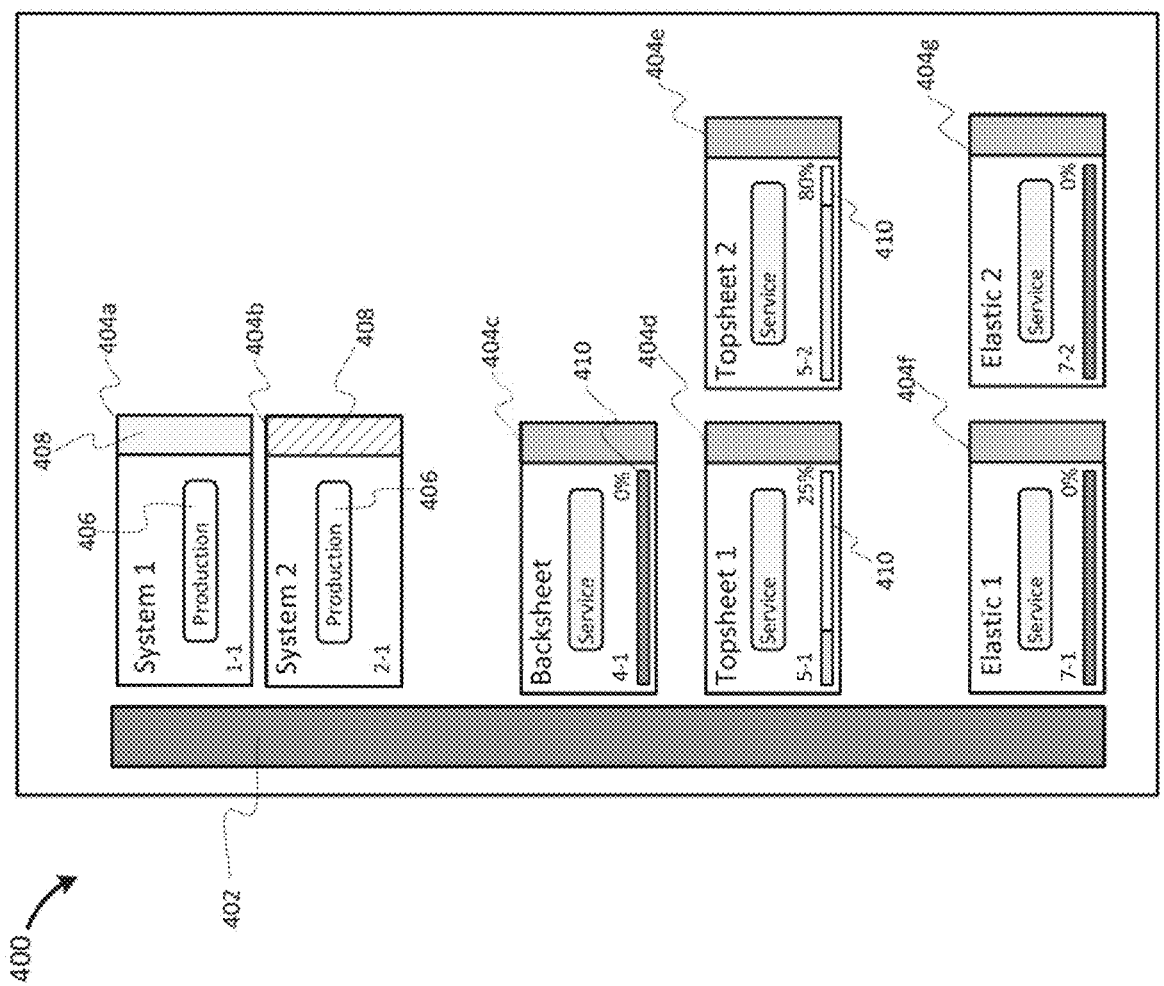
FIG. 4 illustrates an example diagram of a user interface.

FIG. 4 illustrates a user interface 400 that may be used in conjunction with the system 200 of FIG. 2 and/or the system 300 of FIG. 3. The user interface 400 displays a visual representation of a production line and associated systems that reflects the actual layout at the production facility (i.e., a premises). The user interface 400 further indicates various data relating to said systems. The user interface 400 may be implemented by a controller (e.g., a controller 204 of FIGS. 2 and 3) and a panel (e.g., a panel 206 of FIGS. 2 and 3) of one or more melter units (e.g., the melter units 202 of FIGS. 2 and 3). The user interface 400 may be additionally or alternatively implemented by a composite controller (e.g., the composite controller 210 of FIG. 2) and a panel of the melter unit comprising the composite controller (e.g., the melter unit 202e of FIG. 2). The user interface 400 may be additionally or alternatively implemented by a composite controller (e.g., the composite controller 232 of FIG. 3) at a server (e.g., the server 230 of FIG. 3). The user interface 400 may be additionally or alternatively implemented by a computing device (e.g., the computing device 222 of FIGS. 2 and 3) in communication with a composite controller.

The user interface 400 may be associated with a production line (e.g., a production machine). A production line may comprise a production line to manufacture disposable hygiene products or assemble cardboard packaging, for example. The production line is represented in the user interface 400 by a production line element 402. The user interface 400 comprises a plurality of system elements 404a-g (referred to generically as a system element 404 or system elements 404). A system element 404 may be considered a "tile" of the user interface 400. Each system element 404 may be associated with a liquid dispensing system (e.g., the liquid dispensing system 10 of FIG. 1) or other type of system. A system corresponding to a system element 404 may be a melter unit. The systems corresponding to the system elements 404 may be associated with one another via a common composite controller.

A system element 404 may be labeled according to its function in the production line or by another type of designator. For example, the system element 404c is labelled "Backsheet," the system elements 404d, 404e are labelled "Topsheet 1" and "Topsheet 2," respectively, and the system elements 404f, 404g are labelled "Elastic 1" and "Elastic 2," respectively. Each system element 404 may comprise an operation mode element 406 configured to indicate an operation mode of the corresponding system. For example, the operation mode element 406 for the system element 404a indicates that the corresponding system is in production mode. As another example, the operation mode element 406 for the system element 404c indicates that the corresponding system is in service mode. An operation mode element 406 may be color-coded according to the indicated operation mode. The operation mode element 406 of each system element 404 is not labelled in FIG. 4 for clarity of illustration.

The system elements 404 and the production line element 402 are visually arranged on the user interface 400 according to (e.g. to reflect or to correspond with) the relative positions of the corresponding systems and production line at the production facility. For example, a system represented by a system element 404 may be positioned at a particular point on the production line and this position at the production line is reflected in the placement of the system element 404 in the user interface 400 relative to the production line element 402. The relative positioning (and sizing) of the production line element 402 and the system elements 404 are not necessarily to scale.

The position of a system element 404 on the user interface may be adjusted. For example, a user may provide an input to the user interface 400 to adjust the position of a system element 404. Additionally or alternatively, the system implementing the user interface 400 may automatically adjust the positioning of a system element 404. As an example, when a new liquid dispensing system is installed at the production line, this liquid dispensing system may be automatically detected and inserted into the production architecture represented by the user interface 400. A system element 404 may be created in the user interface 400 that corresponds to the newly installed liquid dispensing system. The user (or a controller) then may position the system element 404 according to the actual position of the new liquid dispensing system relative to the production line and the other systems. A user (or a controller) may similarly adjust the position of a system element 404 if the corresponding system is moved from one position on the production line to another position on the production line.

Each system element 404 may indicate the position of the corresponding system at the production line. For example, the system element 404a comprises "1-1" to indicate that the corresponding system is at a first position on the production line and the system element 404b comprises "2-1" to indicate that the corresponding system is at a second position on the production line. As other examples, the system element 404d comprises "5-1" to indicate that the corresponding system is at a fifth position on the production line and is the first system at the fifth position and the system element 404e comprises "5-2" to indicate that the corresponding system is at the fifth position on the production line and is the second system at the fifth position. It is noted that some positions on the production line may not include a system, such as the third and sixth positions.

Each system element 404 further comprises a system status element 408 to indicate the status of the associated system, such as a running status, an off status, or a fault status. In particular, a system status element 408 may be color-coded to represent the system status of the associated system. For example, the system status element 408 for System 1 (system element 404a) may indicate that System 1 is running, the system status element 408 for System 2 (system element 404b) may indicate that System 2 is off, and the system status element 408 for Backsheet (system element 404c) may indicate that Backsheet is in fault status.

Some of the system elements 404 further comprise a fill level element 410 that indicates the fill level of adhesive or other liquid in the melter unit(s) of the corresponding system. The fill level is more particularly visually indicated by a colored bar of the fill level element 410. For example, the bar may be initially green when the melter unit is full but transitions from green to yellow to red as the fill level decreases. The color of the bar may be based on the fill level relative to one or more pre-defined thresholds or threshold ranges. The span of the colored bar likewise decreases as the fill level decreases. The fill level may be with respect to un-melted sold or semi-solid particulate or melted liquid (e.g., adhesive). The fill level is also numerically indicated by a percentage value within the system element 404.

The system elements 404 may be interacted with or activated (e.g., clicked on) to access further information and functionality relating to the corresponding system. For example, activation of a system element 404 may cause a popup interface element to appear over the user interface 400 as it is currently shown in FIG. 4. Or a new, different user interface may be presented to access the further information and functionality. The further information displayed upon activation of a system element 404 may comprise operating parameters for the corresponding system, current and/or past measured data for the corresponding system, and hardware configuration data for the corresponding system. The popup or new user interface may comprise additional user interface elements or "tiles" that correspond to various data categories or components of the system. For example, activation of an interface element for temperature data may cause yet another popup or user interface to be shown that displays the temperature setpoint(s) and measured temperatures values for the system. As another example, activation of an interface element for a particular melter unit of the system may cause another popup or user interface to be shown that displays various aspects of the hardware configuration of the melter unit, such as a number of hose outlets, flow throughput capacity, pump type, physical dimensions, and available control interfaces. A popup or new user interface may be closed to return back to the previous popup or user interface within the hierarchy, including the user interface 400 as it is currently shown in FIG. 4. The user interface 704 and elements thereof shown in FIGS. 9A through 17C are examples of such user interfaces, popups, tiles, or windows that may be integrated with the user interface 400. Additionally or alternatively, the user interface 400 may serve as the MachineView tile 720 of the user interface 704 shown in FIG. 9A, with the system elements 404 of the user interface 400 further adopting the functionalities described in relation to the melter unit elements 733 of the user interface 704.

Figure 5:
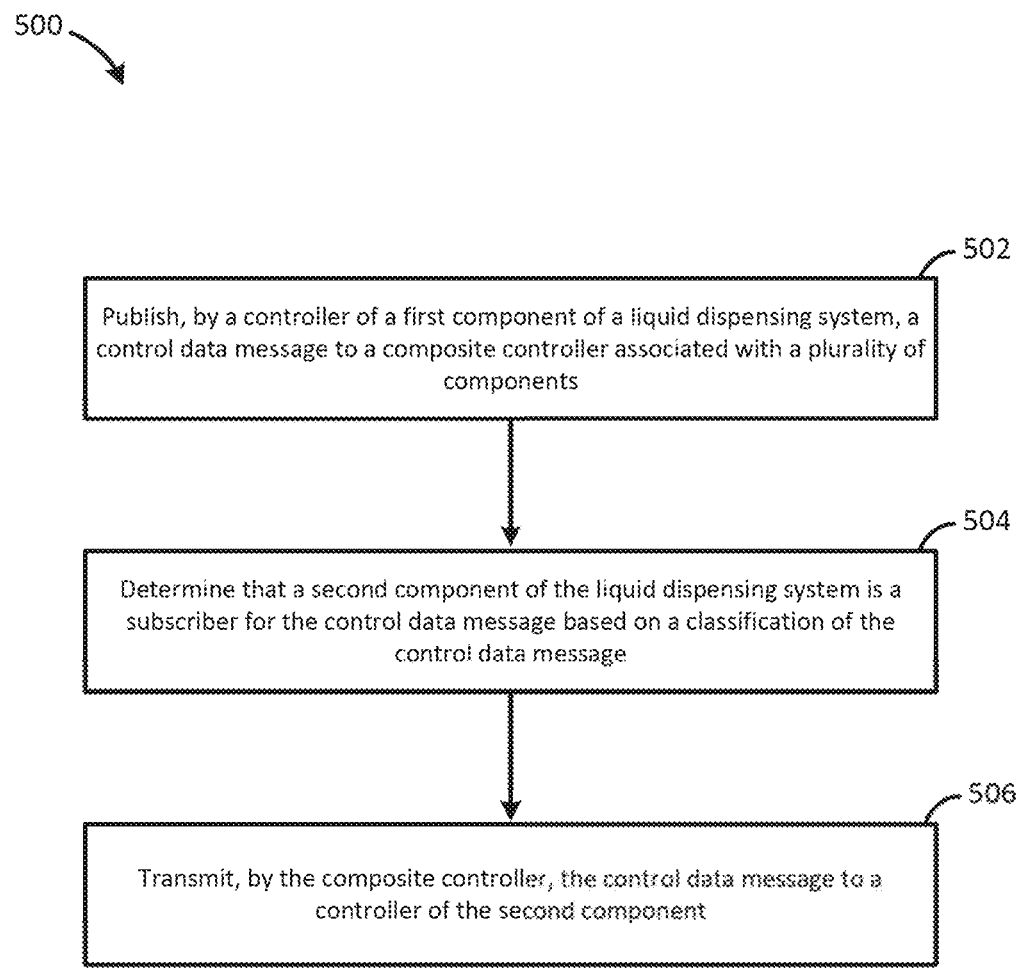
FIG. 5 illustrates an example method flow.

FIG. 5 illustrates a data flow diagram of a method 500 for communicating control data between a plurality of liquid dispensing systems, or components, such as melter units. Specifically, the method 500 may communicate control data between a first melter unit of the plurality of liquid dispensing system melter units and a second melter unit of the plurality of liquid dispensing system melter units. A liquid dispensing system may comprise an adhesive dispensing system, such as the liquid dispensing system 10 of FIG. 1. The method 500 may be executed within the system 200 of FIG. 2 and/or the system 300 of FIG. 3. As such, the plurality of liquid dispensing system melter units may be the same as or similar to the melter units 202 of FIGS. 2 and 3. The liquid dispensing system melter units may comprise melter units for a single liquid dispensing system, the liquid dispensing system melter units may comprise melter units for multiple different liquid dispensing systems, or a combination thereof. For example, the first melter unit and the second melter unit may both belong to the same liquid dispensing system. Or the first melter unit and the second melter unit may belong to different liquid dispensing systems.

At step 502, the first melter unit (e.g., the melter unit 202a of FIGS. 2 and 3) of the plurality of liquid dispensing system melter units publishes (e.g., transmits) a control data message to a composite controller (e.g., the composite controller 210 of FIG. 2 or the composite controller 232 of FIG. 3) associated with the plurality of liquid dispensing system melter units. The control data message may be published by a controller (e.g., the controller 204 of FIGS. 2 and 3) of the first melter unit. Further, the controller may comprise a publisher server (e.g., the server 214 of FIGS. 2 and 3) and a subscriber client (e.g., the client 216 of FIGS. 2 and 3). The controller may comprise an embedded OPC/UA controller. Further, the publisher server and the subscriber client may comprise an embedded OPC/UA publisher server and an embedded OPC/UA subscriber client, respectively. The control data message may be published by the publisher server of the controller of the first melter unit.

The control data message may comprise control data relating to an operating parameter of the first melter unit. For example, the operating parameter may comprise a temperature setpoint, a temperature control loop settings, a control loop type, a pump speed, a pump motor speed, a heater duty cycle, or applicator cycle rate. The control data message may comprise data measured by the first melter unit, such as a liquid temperature, a liquid flow rate, a liquid flow volume, or liquid pressure. The control data message may comprise a hardware configuration of the first melter unit, such as a number of pumps, a pump type, a liquid holding capacity, a number of hose outlets, a power capacity, a number of control interfaces, a melter unit weight, melter unit external dimensions, flow throughput, or melt rate.

The composite controller may be implemented by a third melter unit (e.g., the melter unit 202e of FIG. 2) of the plurality of liquid dispensing system melter units. The third melter unit may comprise a control panel (e.g., the panel 206) configured to display at least a portion of the control data indicated in the control data message. Additionally or alternatively, a remote cloud/edge server (e.g., the server 230 of FIG. 3) associated with the plurality of liquid dispensing system melter units may implement the composite controller.

A computing device (e.g., the computing device 222 of FIGS. 2 and 3) may access, via the composite controller, the control data indicated in the control message. For example, the composite controller may be in communication with the composite controller of the cloud/edge server or the composite controller of the third melter unit. The computing device may be located external to the premises housing the plurality of liquid dispensing system melter units or the computing device may be located at the same premises housing the plurality of liquid dispensing system melter units. The computing device may comprise at least one of a personal computer (PC), a laptop computer, a mobile device, a tablet computer, or a smartphone.

At step 504, it is determined, based on a classification of the control data message, that the second melter unit is a subscriber for the control data message. The composite controller may determine that the second melter unit is a subscriber for the control data message. Determining that the second melter unit is a subscriber may comprise filtering the control data message from a plurality of control data messages received by the composite controller. The determining that the second melter unit is a subscriber for the control data message may be performed according to a topic-based approach and/or a content-based approach.

As examples, the classification of the control data message may be based on a type of melter unit component associated with the control data message, a type of operating parameter associated with the control data message, a type of measured data associated with the control data message, and/or a type of hardware configuration data associated with the control data message. Further, the classification of the control data message may be based on at least one of the control data message comprising operating parameter data, the control data message comprising measured data, or the control data message comprising hardware configuration data. The first melter unit may define, at least in part, the classification of the control data message.

Determining that the second melter unit is a subscriber for the control data message may be further based on a subscriber profile (e.g., subscriber criteria) associated with the second melter unit. The subscriber profile may indicate a subscription to control data messages associated with the classification of the control data message published by the first melter unit. For example, if the control data message is classified as comprising temperature setpoint data, the subscriber profile may indicate a subscription to control data messages comprising temperature setpoint data. Further, the subscriber profile may indicate a subscription to control data messages published by select melter units of the plurality of liquid dispensing system melter units. In this instance, the subscriber profile associated with the second melter unit may indicate a subscription to control data messages published by the first melter unit. Yet further, the subscriber profile may indicate a subscription to control data messages comprising control data that at least one of exceeds a threshold value, is below a threshold value, is within a threshold value range, or is outside of a threshold value range. For example, the subscriber profile associated with the second melter unit may indicate a subscription to control data messages indicating that a measured temperature of liquid exceeds a temperature threshold. The subscriber profile may be defined, at least in part, by the second melter unit.

At step 506, the control data message is transmitted to the second melter unit. The control data message may be transmitted to the second melter unit by the composite controller. The control data message may be transmitted to a controller of the second melter unit. The controller of the second melter unit may comprise an embedded OPC/UA controller. The controller of the second melter unit may comprise a publisher server (e.g., the server 214 of FIGS. 2 and 3) and a subscriber client (e.g., the client 216 of FIGS. 2 and 3). The publisher server and the subscriber client of the second melter unit may comprise an embedded OPC/UA publisher server and an embedded OPC/UA subscriber client, respectively. The data control message may be transmitted to and received by the subscriber client of the controller of the second melter unit.

The method 500 may further comprise displaying control data relating to at least one melter unit of the plurality of liquid dispensing system melter units. The control data may be the control data indicated by the control data message. The control data may be displayed via a user interface (e.g., the user interface 400 of FIG. 4 and/or the user interface 704 of FIGS. 9A-B) associated with the plurality of liquid dispensing system melter units. Via the user interface, an operator may control at least some aspects of the plurality of liquid dispensing system melter units or a dispensing system(s) comprising one or more melter units of the plurality of liquid dispensing system melter units. For example, the user interface may be configured to enable adjustment of at least one operating parameter of at least one melter unit (e.g., the first or second melter unit) of the plurality of liquid dispensing system melter units based on user input to the user interface.

The user interface may be output (e.g., displayed) by the third melter unit (e.g., the melter unit 202e of FIG. 2). The third melter unit may comprise a control panel (e.g., the panel 206 of FIGS. 2 and 3) and the control panel may display the user interface. The third melter unit in this instance may or may not comprise the composite controller. The user interface may be additionally or alternatively output by a computing device (e.g., the computing device 222 of FIGS. 2 and 3) associated with the plurality of liquid dispensing system melter units. The computing device may be in communication with the third melter unit. For example, in instances in which the third melter unit comprises the composite controller, the computing device may be in communication with the composite controller of the third melter unit. The computing device may receive control data, including control data indicated in the control data message, via the third melter unit. This control data may be represented in the user interface that is output by the computing device.

Additionally or alternatively, the computing device may be in communication with a cloud/edge server (e.g., the server 230 in FIG. 3) located remote from the premises housing the plurality of liquid dispensing system melter units. In instances in which the cloud/edge server comprises the composite controller, the computing device may be in communication with the composite controller of the cloud/edge server. The computing device may receive control data, including control data indicated in the control data message, via the cloud/edge server. This control data may be represented in the user interface that is output by the computing device. The computing device may be located remote from the premises housing the plurality of liquid dispensing system melter units, such as a production facility, or the computing device may be at the same premises as that housing the plurality of liquid dispensing system melter units.

The user interface may comprise a production line element (e.g., the production line element 402 of FIG. 2) representing a production line associated with the first melter unit and the second melter unit. The user interface may further comprise a plurality of system elements (e.g., the system elements 404 of FIG. 4). A system element of the plurality of system elements may represent a liquid dispensing system. A system element of the plurality of system elements may represent a liquid dispensing system associated with at least one of the first melter unit or the second melter unit. For example, a first system element may represent a first liquid dispensing system comprising the first melter and a second system element may represent a second liquid dispensing system comprising the second melter. The production line element and the plurality of system elements may be arranged on the user interface to reflect the relative positions at an associated premises (e.g., production facility) of the production line and the liquid dispensing systems represented by the plurality of system elements.

At least one system element of the plurality of system elements may comprise an operation mode element (e.g., an operation mode element 406 of FIG. 4) indicating an operation mode of the represented liquid dispensing system. For example, an operation mode element may indicate that the represented liquid dispensing system is in a production mode, a setup mode, or a service mode. At least one system element of the plurality of system elements may comprise a fill level element (e.g., a fill level element 410 of FIG. 4) indicating a fill level associated with the represented liquid dispensing system. The fill level may be with respect to a fill level of liquid in a melter unit of the liquid dispensing system, for example. A system element may be configured such that, upon activation, an interface element (e.g., a popup) is displayed. The interface element may indicate control data associated with the liquid dispensing system represented by the system element. For example such control data may comprise a plurality of measured temperatures at various points within the liquid dispensing system.

Figure 6:
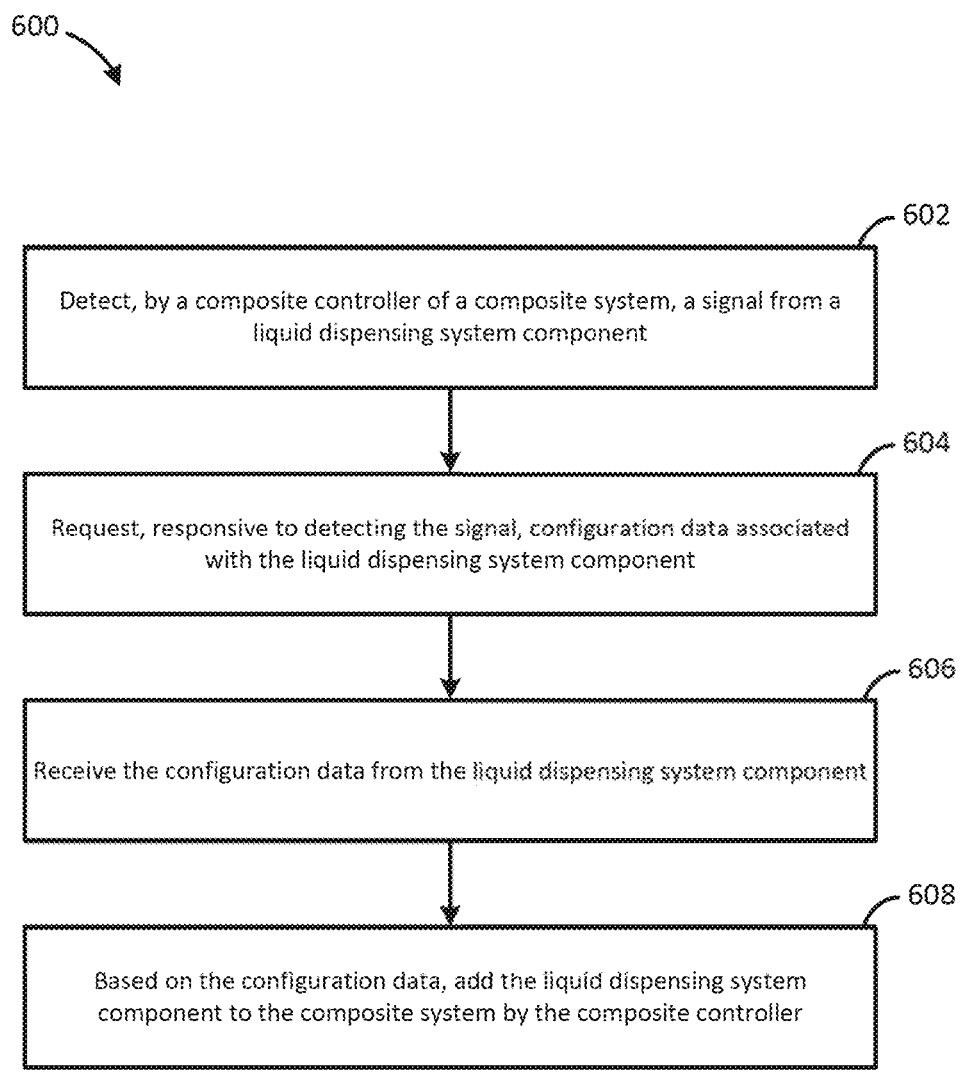
FIG. 6 illustrates another example method flow chart.

FIG. 6 illustrates a method flow diagram of a method 600 for adding a liquid dispensing system component to a composite system (e.g., the system 200 of FIG. 2 and/or the system 300 of FIG. 3). The composite system may comprise a composite controller (e.g., the composite controller 210 of FIG. 2 and/or the composite controller 232 of FIG. 3) and a plurality of liquid dispensing systems (e.g., the liquid dispensing system 10 of FIG. 1). The liquid dispensing system component may comprise a melter unit (e.g., a melter unit 202 of FIGS. 2 and 3). Adding the melter unit to the composite system may comprise adding the liquid dispensing system of which the added melter unit is a part to the composite system. In some aspects, the liquid dispensing system component may comprise a liquid dispensing system itself.

Adding the liquid dispensing system component may comprise integrating the functionality of the liquid dispensing system component to the functionality of the composite system as a whole. As an example, the method 600 may be initiated responsive to the liquid dispensing system component being installed at a production line alongside other liquid dispensing systems of the composite system.

At step 602, a signal is detected from the liquid dispensing system component. The signal may be generated by the liquid dispensing system component. The signal may be generated by a controller (e.g., a controller 204 of FIGS. 2 and 3) of the liquid dispensing system component. The controller may be a melter unit. The signal may comprise a beacon signal, for example. The signal may be detected by the composite controller on a network to which the composite controller is connected. As an example, the network may comprise a LAN (e.g., a WLAN) at the production facility housing the composite system. The liquid dispensing system component may generate the signal responsive to the liquid dispensing system component being connected to the network.

At step 604, configuration data associated with the liquid dispensing system component is requested. The request may be responsive to detecting the signal. The request may be sent by the composite controller and to the liquid dispensing system component. The request may be sent to the controller of the liquid dispensing system component.

At step 606, the configuration data is received from the liquid dispensing system component. The composite controller may receive the configuration data. The configuration data may be received based on the request for the configuration data. The configuration data may comprise hardware configuration data associated with the liquid dispensing system component. For example, hardware configuration data may comprise at least one of a number of pumps, a pump type, a liquid holding capacity, a number of hose outlets, a power capacity, a number of control interfaces, a melter unit weight, melter unit external dimensions, flow throughput, or melt rate.

At step 608, the liquid dispensing system component is added to the composite system based on the configuration data. The composite controller may add the liquid dispensing system component to the composite system. After the liquid dispensing system component is added to the composite system, the liquid dispensing system component may operate on a production line with one or more of the liquid dispensing systems of the composite system.

The method 600 may further comprise representing the added liquid dispensing system component on a user interface (e.g., the user interface 400 of FIG. 4 and/or the user interface 704 of FIGS. 9A-B) associated with the composite system. The composite controller may cause the user interface to be output. For example, a control panel (e.g., a panel 206 of FIGS. 2 and 3) of a melter unit may output the user interface. A melter unit may comprise both the composite controller and a control panel that outputs the user interface. Additionally or alternatively, a computing device (e.g., the computing device 222 of FIGS. 2 and 3) in communication with the composite controller may output the user interface.

The user interface may comprise a plurality of system elements (e.g., the system elements 404 of FIG. 4) that each represent a liquid dispensing system of the composite system. The user interface may further comprise a production line element (e.g., the production line element 402 in FIG. 4) representing a production line associated with the composite system. The plurality of system elements and the production line element may be arranged in the user interface to reflect the actual arrangement of represented liquid dispensing systems and the production line at the production facility (i.e., premises).

Responsive to the liquid dispensing system component being added to the composite system, a system element representing the newly-added liquid dispensing system component may be generated on the user interface. An operator may provide a user input to the user interface to cause the system element representing the liquid dispensing system component to be generated. Like the production line element and the initial system elements on the user interface, the system element representing the liquid dispensing system component may be likewise positioned on the user interface to reflect the relative positioning of the liquid dispensing system component, the represented liquid dispensing systems, and the production line at the production facility. The system element representing the added liquid dispensing system component may be positioned as such automatically (e.g., based on logic provided by the composite controller) or based on user input. For example, an operator may drag-and-drop the system element representing the added liquid dispensing system component.

A system element, including the system element representing the added liquid dispensing system component, may be configured such that, upon activation, an interface element (e.g., a popup) is displayed. The interface element may indicate control data associated with the liquid dispensing system (or component thereof) represented by the system element. For example such control data may comprise a plurality of measured temperatures at various points within the liquid dispensing system.

Figure 7:
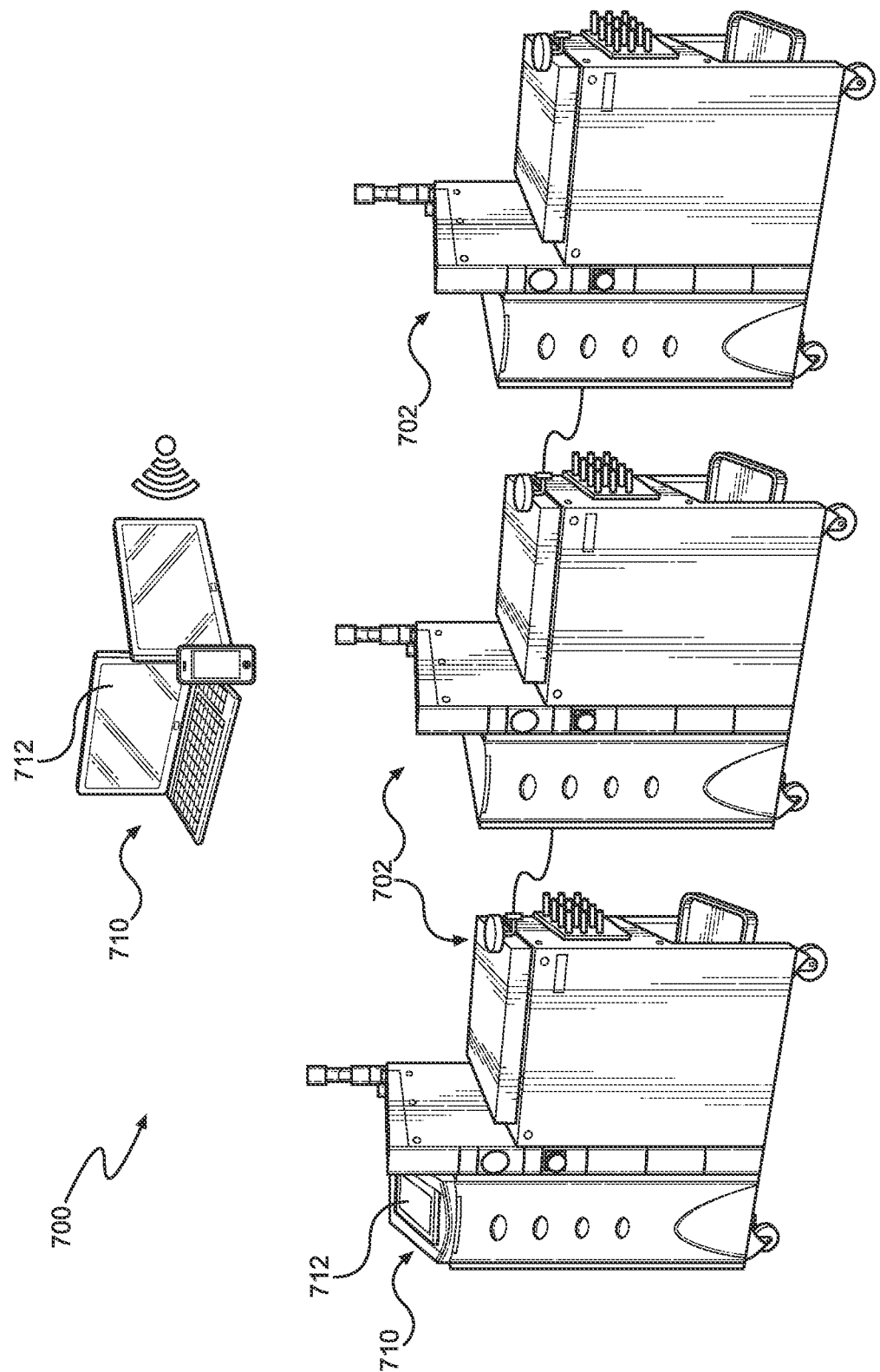
FIG. 7 illustrates an example diagram of a composite system.

FIG. 7 illustrates at least a portion of an example composite system 700 comprising three operatively connected melter units 702. The system 700 of FIG. 7 may be the same as or similar to the liquid dispensing system 10 of FIG. 1, the system 200 of FIG. 2, and/or the system 300 of FIG. 3 in at least some aspects. Likewise, a melter unit 702 of FIG. 7 may be the same as or similar to the melter unit 20 of FIG. 1 and/or a melter unit 202 of FIGS. 2-3 in at least some aspects. As such, a melter unit 702 may comprise a reservoir configured with one or more heaters to melt solid or semi-solid adhesive supplied to the melter unit 702. A melter unit 702 may further comprise a manifold to distribute the melted adhesive, via connected hoses (e.g., heated hoses), to one or more applicators (e.g., the applicators configured to dispense the melted adhesive). Additional heaters may be found throughout the system 700, including at or within the manifold, hoses, or applicators associated with respective melter units 702. The system 700 may likewise comprise one or more sensors to measure the temperature of the melted adhesive at various points within the system 700, such as within the reservoir, manifold, hoses, or applicators of respective melter units 702. Although they are not shown in FIG. 7, the one or more applicators, hoses, and any adhesive supply device(s) (e.g., a hopper) may be considered part of the system 700. It is contemplated that each melter unit 702 of the system 700 provides melted adhesive to one or more applicators particularly associated with that melter unit 702.

Figure 8:
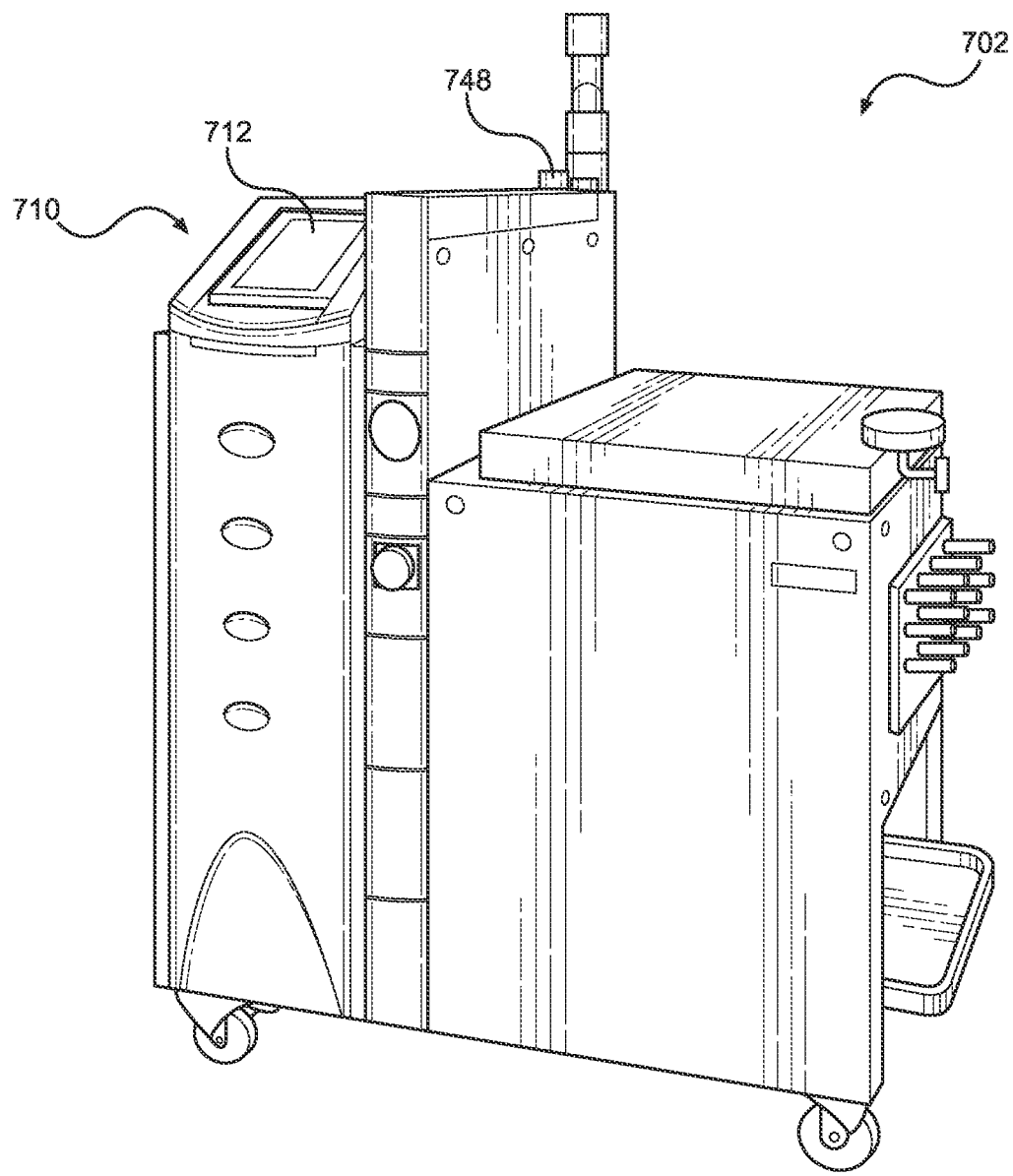
FIG. 8 illustrates an example diagram of a melter unit.

While the system 700 is depicted in FIG. 7 as having three melter units 702, it will be understood that the system 700 may have any suitable number of melter units 702 depending on the type of melter units 702, the type of material to be dispensed, the quantity of material that will need to be melted and dispensed, and/or other manufacturing factors. Further, the melter units 702 of the system 700 may include melter units 702 of different types and/or melter units operating according to different operating parameters or configurations. FIG. 8 illustrates an enlarged view of a single example melter unit 702.

A melter unit 702 (e.g., the associated control device 710) may further comprise a communication interface, such as a wireless interface 748, to effectuate network communication with other devices, including another control device 710 or a cloud system. The wireless interface 748 may communicate via Wi-Fi, for example. The wireless interface 748 may additionally or alternatively comprise a cellular communication device.

The system 700 may comprise one or more control devices 710 configured to display information relating to the system 700, such as information relating to one or more of the melter units 702 of other components of the system 700. A control device 710 of FIGS. 7 and 8 may be the same as or similar to the controller 28 of FIG. 1 and/or the composite controllers 204 of FIGS. 2 and 3 in at least some aspects. A control device 710 may be disposed on one or more of the melter units 702 or other component. For example, such a control device 710 may be embedded in a melter unit 702. In an aspect, only a single melter unit 702 of the system 700 is configured with a control device 710. For example, such single melter unit 702 configured with the control device 710 may be the same as or similar to the melter unit 202e of FIG. 2 that is configured with the composite controller 210.

Indeed, the composite controller 210 and the control device 710 may be implemented in the same computing module or device.

Additionally or alternatively, a control device 710 maybe a stand-alone device that is in communication with (e.g., wireless or wired) one or more of the individual melter units 702 or other components of the system 700. A stand-alone control device 710 may comprise a desktop computer, a portable computer, a tablet, and/or a mobile phone. In an aspect, the system 700 may include multiple control devices 710. For example, the system 700 may have one or more control devices 710 in direct wired communication with one or more other melter units 702 and/or one or more stand-alone control devices 710 in wireless communication with one or more melter units 702. A stand-alone control device 710 may be the same as or similar to the computing device 222 of FIGS. 2 and 3 in some aspects. Control functions of a stand-alone control device 710 may be facilitated by a cloud system, which may comprise a server the same as or similar to the server 230 of FIG. 3 in some aspects.

FIGS. 9A through 17C illustrate various aspects of a user-customizable graphical user interface 704 output by the control device 710, such as via the screen 712 of the control device 710. While the user interface 704 and associated features are generally discussed in relation to melter units, such disclosure is equally applicable to other components of the system 700, including applicators, dispensing modules, hoses, solid or semi-solid adhesive supply devices, or heaters disposed within such other components. Generally, the user interface 704 is configured to display control data (e.g., operating parameters or status information) of the multiple melter units 702 and other components of the system 700. The user interface 704 is further configured to enable a user to set or adjust various operating parameters of the melter units 702 and other components of the system 700. It will be understood that the specific parameters that may be displayed and/or controlled via the user interface 704 will depend on the particular type of melter unit 702, the material to be dispensed, and/or the specific manufacturing protocols implemented in the given system 700. As examples, such parameters may include, but are not limited to, temperature of various components, pump rotation speed, volume of material, pressure, dispensing pattern, quantity of material dispensed, type of material dispensed, presence of a gas, operational status of a melter, geographical and distance information, specific permission information, and relative positionings of the melter units 702 and other components of the system 700 at a production facility. In an aspect, the user interface 704 is configured to display, set, modify, communicate, and otherwise manipulate control data, such as the control data discussed in relation to FIGS. 1-6 and throughout the present disclosure.

The control device 710 may allow access to multiple modes of operation. For example, in a "Production" mode, certain parameters may be changed. Setpoints and modes of operation may be altered, while other system configurations may be prevented from being changed. In a "Setup" mode, the control device 710 may allow for simulation of the system, initial set up of parameters, verifying component functionality, and purging of the system. In a "Service" mode, the control device 710 may allow for maintenance of a melter unit 702 or other component (e.g., replacing pumps, filters, or other components).

The control device 710 may allow one or more users to monitor and/or change parameters of multiple melter units 702 or other components simultaneously. This may reduce the time necessary to monitor each individual melter unit 702 or other component separately. Additionally, the user may send commands to all melter units 702 or other components in the system 700 at the same time rather than have to individually modify parameters for each separate melter unit 702 or other component.

The control device 710 may allow a user to compare individual melter units 702 to determine damage, defects, or other inconsistencies within the system 700. By allowing control of all melter units 702 in the system 700, a user may stop or pause one or more melter units 702 for any number of reasons (e.g., maintenance, overheating, reloading of material, etc.) and ensure that the remaining melter units 702 within the system 700 compensate for the stopped or paused melter. This may help maintain consistent production and reduce downtime.

As noted, the user interface 704 is configured for user customization. For example, much of the status/parameter information and control functions are presented via a series of interactive interface elements referred to as "tiles." The particular configuration as to which tiles are displayed on the user interface 704, where they are displayed on the user interface 704, and when they are displayed on the user interface 704 may be determined, at least in part, by a user's preference settings.

Figure 9A:
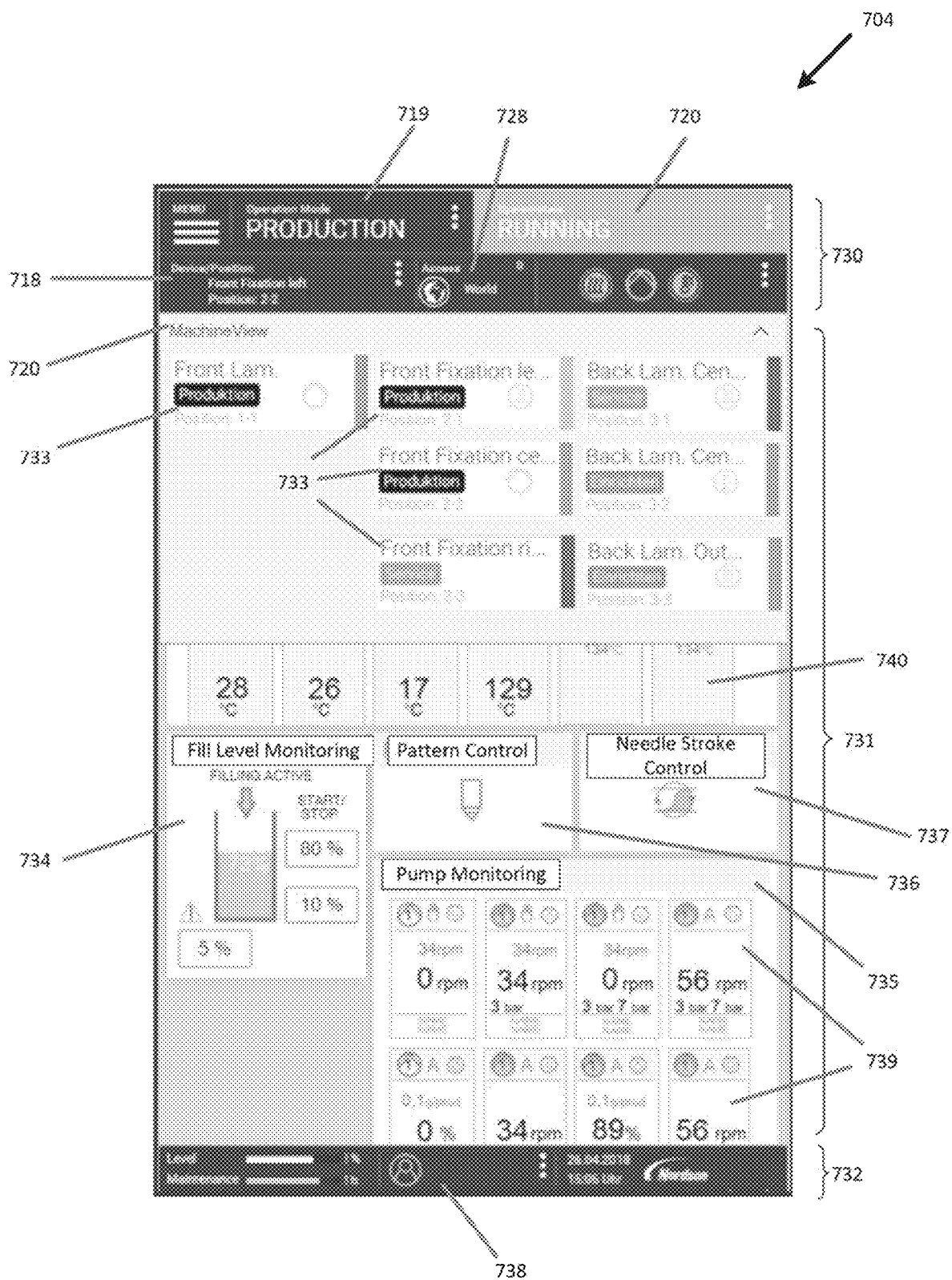
FIGS. 9A and 9B illustrate example diagrams of a user interface.
Figure 9B:
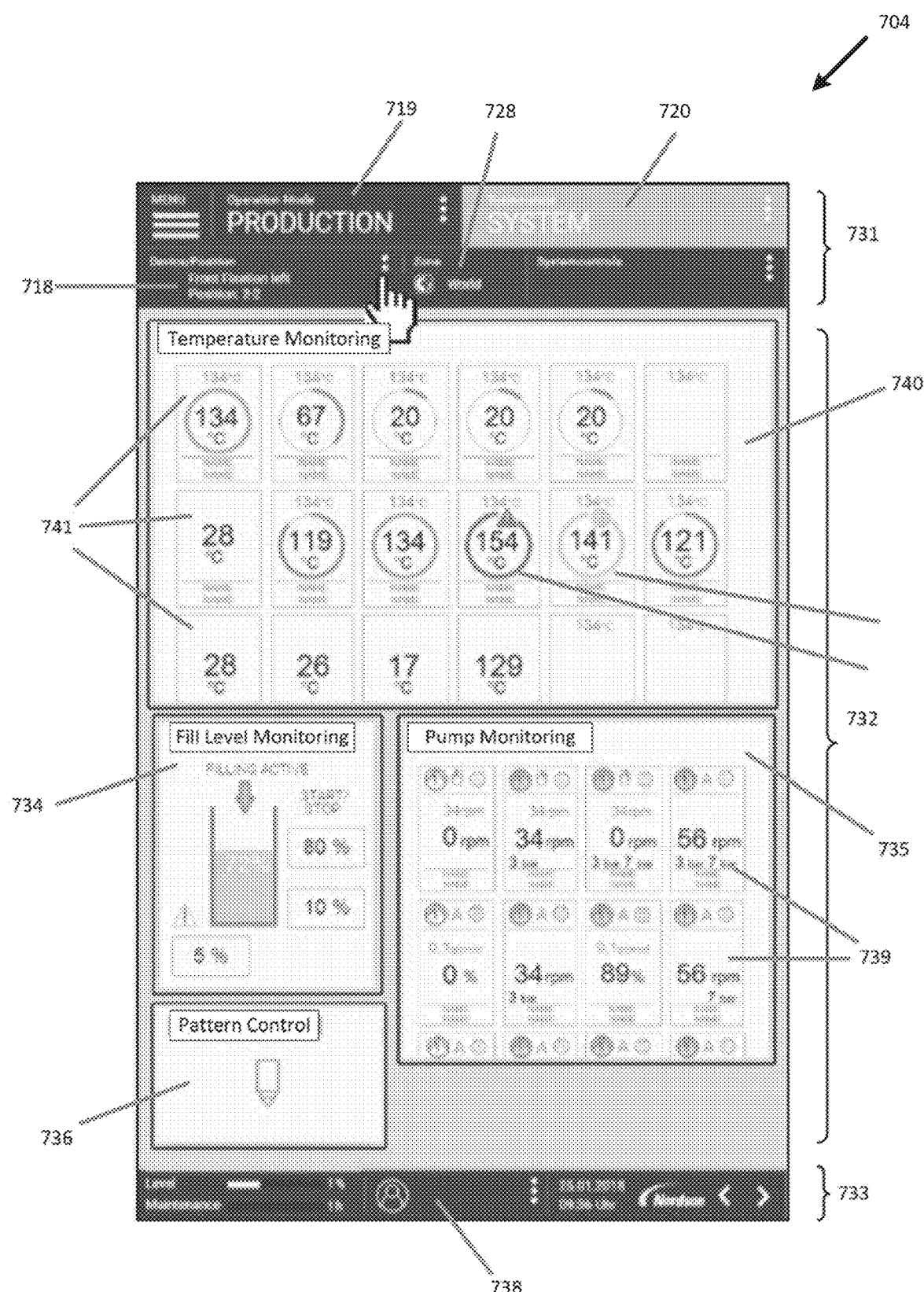

FIGS. 9A and 9B illustrate the user interface 704, each according to slight variations and/or states of the user interface 704. The user interface 704 is divided into a status area 730, a dashboard area 731, and a navigation area 732. The dashboard area 731 is generally the area within which the aforementioned tiles are displayed and interacted with.

With regard to the status area 730, an element 718 indicates a selected melter unit 702 or other component for which various information and control functions are presented, at least in part, within the dashboard area 731. The selected melter unit 702 indicted in the element may be selected from the various melter units 702 represented in the MachineView tile 720. Additionally or alternatively, the melter unit 702 indicated by the element 718 may be selected via a drop down menu associated with the element 718. An operation mode element 719 indicates the operation mode of the selected melter unit 702, such as Production, Setup, or Service. The operation mode of the selected melter unit 702 may be controlled via the operation mode element 719. A system state element 721 indicates a state of the system 700, which may also be controlled via the system state element 721. A zone element 728 indicates a zone within which the control device 710 displaying the user interface 704 is located. The indicated zone may determine which of the various controls of the system 700 may be set or adjusted via that particular control device 710. Functionality relating to zones shall be discussed further in relation to FIG. 18 and FIGS. 19A-B. With regard to the navigation area 732, a current date and time are presented. The navigation area 732 further comprises an interface element 738 that may be activated to initiate various user functions. For example, a user may enter the user's id and password to log into the system and load the user's preference settings relating to user interface configuration.

The dashboard area 731 is configured to display one or more tiles. A tile may display various information relating to the system 700, a selected melter unit 702, and/or statuses/operating parameters of various sub-systems or functions of the selected melter unit 702. A tile may additionally or alternatively enable various operating parameters or settings to be set or adjusted. Some tiles may be configured with multiple sub-tiles. Some tiles (including sub-tiles) may be configured to open other tiles or windows, which typically provide further information or access to additional settings or controls related to the initial tile. Via user preference settings, a user may customize various attributes of the dashboard area 731 that are applied when the user is logged into the user interface 704 and/or control device 710. For example, user preference settings may define which tiles are initially displayed in the dashboard area 731. User preference settings may further define the initial placement of the tiles within the dashboard area 731 and/or the relative sizes of the tiles. User preference settings may yet further define what actions or functions are performed when particular tiles or tile elements are activated or interacted with (e.g., clicked or pressed). A user may additionally or alternatively alter the arrangement or appearance of the tiles while the user interface 704 is displayed, such as closing a tile, moving a tile (e.g., drag and drop), or minimizing a tile. A tile may also be positioned on top of another tile, in whole or in part.

Generally, tiles may be organized as hierarchies of one or more tile types, with each hierarchy being associated with a particular functionality or subsystem of a melter unit 702 and/or the system 700 (i.e., a functional aspect). As examples, a hierarchy of tile types may be associated with one of temperature/heaters, pumps, fill level, dispensing patterns, adhesive pressure, and needle stroke. Generally, activation of a tile or portion thereof (e.g., a sub-tile, element, or button) within a hierarchy will open another tile of a different type within the hierarchy. Further, activation of a tile or portion thereof (e.g., sub-tile, element, or button) of a given type level within a hierarchy will open another tile of a higher type level within the hierarchy. For example, activation of a type 1 temperature tile may typically open a type 2 temperature tile. If an initial tile comprises multiple sub-tiles or elements, the subsequent tile may relate to the particular sub-tile or element activated in the initial tile. For example, activation of a heater sub-tile in a type 2 temperature tile may open a type 3 temperature tile displaying information and/or operating parameters for the heater corresponding to the activated heater sub-tile. The initial tile may be replaced in the dashboard area 731 by the subsequent tile or the subsequent tile may overlay at least a portion of the initial tile in the dashboard area 731. It is noted, however, that display of a higher type level tile is not necessarily reliant upon the activation or even display of a lower type level tile. For example, the tiles displayed may be determined by user preference settings, melter unit display settings, or general display settings. The tiles displayed may be further determined based on other user interactions with the user interface 704. The various hierarchies of tile types and their constituent tiles will be discussed further in relation to FIGS. 10A through 17C.

As shown in FIG. 9A in particular, the dashboard area 731 may be configured with a MachineView tile 720 that presents one or more melter unit elements 733 (which may be considered tiles themselves), each representing a melter unit 702 of the system 700. Additionally or alternatively, the MachineView tile 720 may comprise one or more elements, analogous to the melter unit elements 733, each representing a component of the system 700 (e.g., components of the system 700 other than melter units 702). Discussion herein relating to melter unit elements 733 is equally applicable to MachineView elements representing components other than melter units 702. Not all melter unit elements 733 shown in the MachineView tile 720 are labeled for clarity of illustration.

As noted with respect to the user interface 400 of FIG. 4, aspects of the user interface 400 may be applied to the MachineView tile 720. As such, the MachineView tile 720 may be the same as or similar to the user interface 400 in some aspects. For example, a melter unit element 733 may be the same as or similar to a system element 404 of the user interface 400 in some aspects. As another example, the MachineView tile 720 may comprise a production line element 402 of the user interface 400 and the plurality of melter unit elements 733 may be positioned in the MachineView tile 720 to reflect the actual positions of the corresponding melter units 702 or other components relative to a production line corresponding to the production line element 402.

Each melter unit element 733 indicates a name of the associated melter unit 702, a position of the associated melter unit 702 (e.g., a position relative to a production line), and an operation mode of the associated melter unit 702 (e.g., production, service, or setup). The element in a melter unit element 733 indicating the operation mode may be color-coded to further indicate the operation mode. Each melter unit element 733 further may visually indicate a status of an operating parameter of the associated melter unit 702, such as an adhesive fill level. The vertical bar to the far right of each melter unit element 733 may be color-coded to visually indicate the status of the operating parameter.

A melter unit 702 may be selected via selection of the associated melter unit elements 733 in the MachineView tile 720 and/or via the element 718. Upon such selection, one or more tiles may be displayed that are associated with the selected melter unit 702. The tiles may be presented according to the user preference settings, default settings associated with the selected melter unit 702, and/or general default settings. One or more tiles may be pre-placed or persist regardless of which melter unit 702, if any, is selected.

With continued reference to FIG. 9A, the "Front Fixation left" melter unit is selected. This may cause a fill level monitoring tile 734 and a pump monitoring tile 735 to be displayed in the dashboard area 731. A pattern control tile 736 and/or an needle stroke control tile 737 may be displayed responsive to selection of the "Front Fixation left" melter unit or the pattern control tile 736 and/or the needle stroke control tile 737 may be already displayed in the dashboard area 731. The pattern control tile 736 and the needle stroke control tile 737 are type 1 tiles of the dispensing pattern hierarchy and the needle stroke hierarchy, respectively. The fill level monitoring tile 734 is a type 3 tile of the fill level tile hierarchy and the pump monitoring tile 735 is a level 2 tile of the pump tile hierarchy. A level 2 temperature monitoring tile 740 is partially shown behind the other tiles and elements in the dashboard area 731.

The fill level monitoring tile 734 visually, as well as numerically, indicates the current fill level percentage (72%) of the adhesive reservoir associated with the "Front Fixation left" melter unit. The fill level monitoring tile 734 further indicates a fill level parameter at which an auto-fill function is activated (10%), a fill level parameter at which the auto-fill function is de-activated (80%), and a fill level parameter at which a warning is generated (5%). A user may directly set or adjust the parameters indicated in the fill level monitoring tile 734 by editing the corresponding text field.

The pump monitoring tile 735 comprises one or more pump sub-tiles 739 each corresponding to a pump of the selected "Front Fixation left" melter unit 702. Not all pump sub-tiles 739 are labeled for clarity of illustration. Each pump sub-tile 739 indicates one or more of a name of the corresponding pump, the current speed (rpm) of the pump, a setpoint speed for the pump, and pressure measurement(s) associated with the pump. The color-coded circle element within each pump sub-tile 739 may indicate the status of the corresponding pump. The hand icon or, alternatively, the upper-case "A" within the upper portion of each pump sub-tile 739 may indicate that the pump is set to a manual mode or an automatic mode, respectively. The sub-tile 739 may additionally or alternatively represent pump motors, some of which may be pump motors for the same pump.

The pattern control tile 736 may, upon activation, initiate a dispensing pattern selection function. In particular, activation of the pattern control tile 736 may cause a type 2 pattern tile to be displayed within which a dispensing pattern may be selected. The dispensing pattern may be used by one or more applicators associated with the selected "Front Fixation left" melter unit 702 to dispense adhesive or other liquid. In some aspects, the dispensing pattern selected via the pattern control tile 736 may be used by the applicators associated with more than one melter units 702 of the system 700. The needle stroke control tile 737 may, upon activation, initiate needle stroke control and detection functions, such as displaying the needle stroke statuses from various channels and setting needle stroke control and detection parameters.

With reference to FIG. 9B, the user interface 704 is similar in many respects to that shown in FIG. 9A. Yet notable differences in FIG. 9B's user interface 704 include the absence of a MachineView tile and the display of the full temperature monitoring tile 740 (as opposed to the obscured partial display of the temperature monitoring tile 740 in FIG. 9A). Additionally, the fill level monitoring tile 734, the pattern control tile 736, and the pump monitoring tile 735 are positioned differently than in FIG. 9A. This may be due to different user preference settings in effect between the user interface 704 of FIG. 9A and the user interface 704 of FIG. 9B.

As noted, the dashboard area 731 comprises a temperature monitoring tile 740 that generally indicates the temperatures of the selected "Front Fixation left" melter unit's 702 heaters or at other points within the "Front Fixation left" melter unit 702 (including associated applicators, hoses, and other components). Such temperature points (e.g., temperature channels) each correspond to one of the temperature sub-tiles 741 within the temperature monitoring tile 740. Depending on the particular component or location at which the temperature is measured, the component's status, and/or various display settings, a temperature sub-tile 741 may indicate one or more of a heater temperature setpoint, a current measured temperature, and a name of the heater or other component.

FIGS. 10A through 17C illustrate example tiles or other user interface elements. FIGS. 10A through 17C are generally organized according to the melter unit subsystem or functionality associated with the tile(s) illustrated in a particular Figure. As already noted above, the tiles and other user interface elements may be generalized into hierarchies of user interface types. A type 1 tile may generally indicate the subsystem or functionality associated with the hierarchy (e.g., temperature, fill level, etc.). A type 1 tile may also indicate one or more basic measured values and/or operating parameters in some instances. Upon activation of a type 1 tile, a type 2 tile may be displayed. The type 2 tile may comprise a multiple sub-tile display, with each sub-tile indicating various measured data and operating parameters. A type 2 tile, however, is not necessarily so limited. Activation of a sub-tile within a type 2 tile may open a further window or dialog box (i.e., a secondary sub-tile) via which a user may set or adjust various operating parameters of the associated subsystem or component. A type 3 tile may further enable a user to set or adjust various parameters (e.g., a parameter list).

Figure 10C:
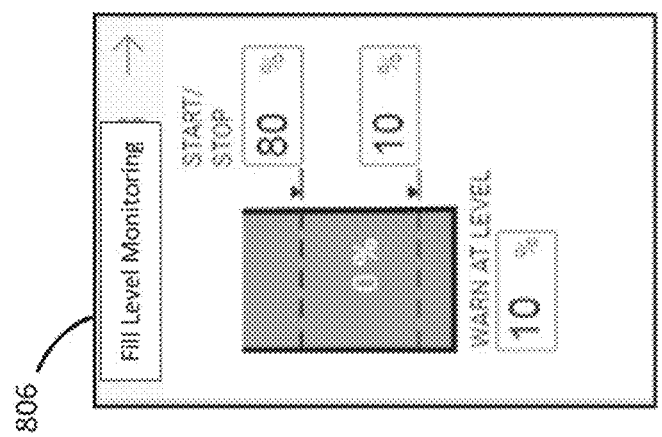
Figure 10B:
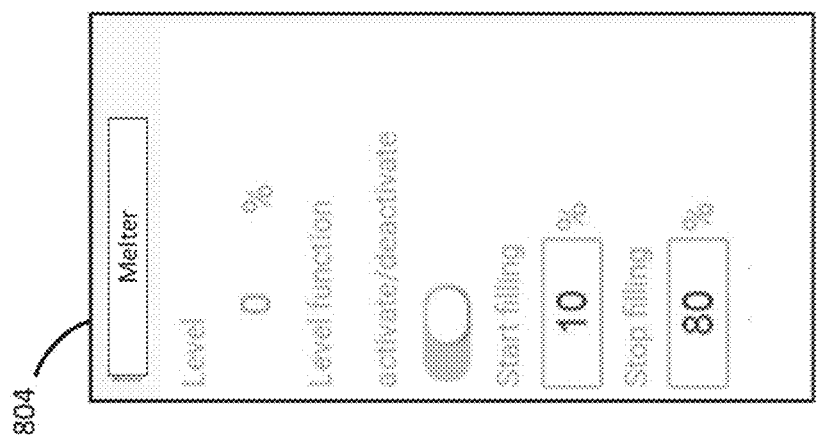
Figure 10A:
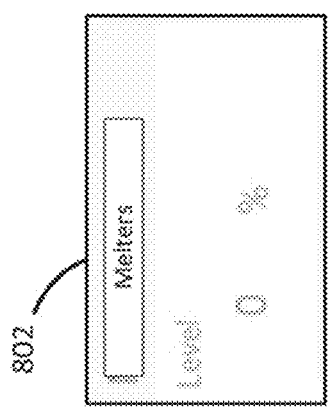

FIGS. 10A-C relate to an adhesive fill level of a selected melter unit 702. FIG. 10A illustrates a type 1 tile 802. Activation of the tile 802 may facilitate access to settings, operating parameters, status, or measured values associated with adhesive fill level. The tile 802 may further indicate a fill level of the melter unit 702 as a percentage. FIG. 10B illustrates a type 2 tile 804. The tile 804 indicates the current measured fill level (0%), an interactive slide element to activate or deactivate an autofill feature of the melter unit 702, an editable text field to set the fill percentage at which the autofill feature should start, and an editable text field to set the fill percentage at which the autofill feature should stop. The tile 804 may be displayed responsive to activation of the type 1 tile 802. FIG. 10C illustrates a type 3 tile 806. The tile 806 also indicates the autofill start and stop percentages. A visual element of the tile 806 visually indicates the fill level and the start and stop autofill fill levels, as well as providing a numerical indication of the fill level. The tile 806 further indicates a fill level percentage at which a warning is generated. The text fields for the start percentage, the stop percentage, and the warning percentage may be editable. Display of the tile 806 may be responsive to activation of an element of the type 2 tile 804 and/or the type 1 tile 802. Whether the tile 804 or the tile 806 is displayed responsive to activation of the type 1 tile 802 may be based on user preference settings and/or user/zone permissions.

Figure 11A:
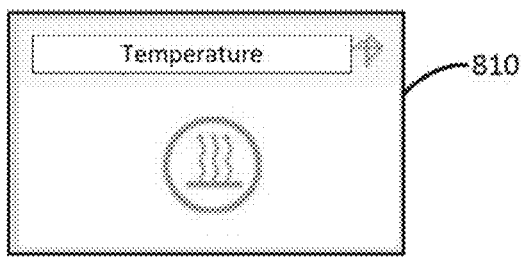

FIGS. 11A-E relate to temperatures, including the temperatures of the heaters of the selected melter unit 702 and the temperatures at various other points within the melter unit 702 (and associated applicators and hoses). FIG. 11A illustrates a type 1 tile 810. Activation of the tile 810 may facilitate access to settings, operating parameters, status, or measured values associated with temperature.

Figure 11B:
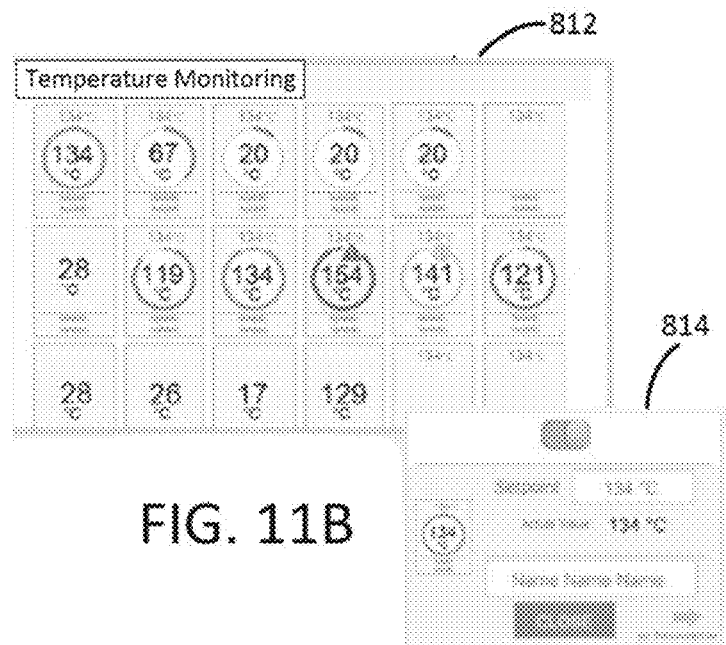

FIG. 11B illustrates a type 2 tile 812 comprising a plurality of temperature sub-tiles. The tile 812 may be displayed responsive to activation of the tile 810. The temperature sub-tiles may each correspond to a heater of the melter unit 702 or a temperature measurement point within the melter unit 702 or associated components (e.g., applicators and hoses). A heater or temperature measurement point may be referred to variously as a temperature channel. A temperature sub-tile may indicate a heater temperature setpoint (e.g., 134° C.), a measured actual temperature (e.g., 134° C. or 67° C.), and a name of the heater or other component. A temperature sub-tile may further includes a color-coded circular indicator surrounding the measured actual temperature. The color of the circular indicator may reflect the current measured temperature in relation to the temperature setpoint. For example, the color of the circular indicator may indicate that the current measured temperature is at the temperature setpoint, the associated heater is actively heating to the temperature setpoint, the current measured temperature is marginally below or above the temperature setpoint (warning), or the current measured temperature is significantly below or above the temperature setpoint (fault). The circular advancement of the colored portion of the colored indicator may reflect the relationship of the measured actual temperature to the temperature setpoint. Further icons may be displayed on a temperature sub-tile in the case of warning or fault temperature conditions.

The visual appearance, displayed information, and/or functionalities of a temperature sub-tile may depend on the state of the associated heater or other component, the mode of the temperature sub-tile (e.g., display mode or control mode), and/or the user/zone permissions for an active user. For example, the heater or other component associated with the temperature sub-tile to the far upper right of the tile 812 is turned off and thus no measured actual temperature is displayed. As another example, the temperature sub-tile in the left lower corner of the tile 812 and/or its associated heater or other component is set to a display mode. In the display mode, only the measured actual temperature (i.e., 28° C.) and name are displayed and the dialog box of window 814 is not displayed when the temperature sub-tile is activated. The display mode may be likened to a "read-only" mode. A temperature sub-tile and/or its associated heater or other component may be set to the display mode based on user permissions and/or zone. Conversely, a temperature sub-tile and/or its associated heater or other component may be set to a control mode in which full information is displayed on the temperature sub-tile and the window 814 is displayed upon activation of the temperature sub-tile to allow various parameters to be edited. As an example, the temperature sub-tile at the upper left of the tile 812 (showing 134° C.) is in a control mode.

FIG. 11B further illustrates a dialog box or window 814 that is displayed responsive to activation of one of the temperature sub-tiles of the tile 812. The window 814 may be considered a secondary type 2 tile of the tile 812. The window 814 may be considered part of the tile 812. The window 814 comprises an interactive slide element to activate or turn on the corresponding heater. The window 814 comprises editable text fields for temperature setpoint and name. The window 814 also indicates a measured actual temperature. The window 814 further comprises a visualization of the activated temperature sub-tile as it is displayed in the tile 812. The window 814 comprises a "CLOSE" button to close the window 814. The window 814 further comprises an arrow element. Activation of the arrow element causes a parameter list to be displayed. Activation of the arrow element may cause a tile 816 of FIG. 11C, a tile 818 of FIG. 11D, and/or a tile 820 of FIG. 11E to be displayed. The tile(s) displayed responsive to activation of the arrow element may depend on user preferences settings.

Figure 11D:
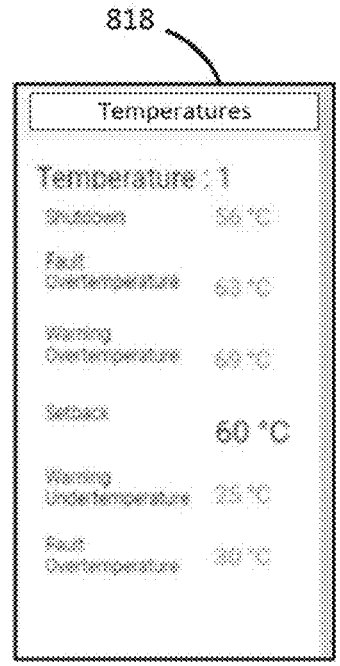
Figure 11C:
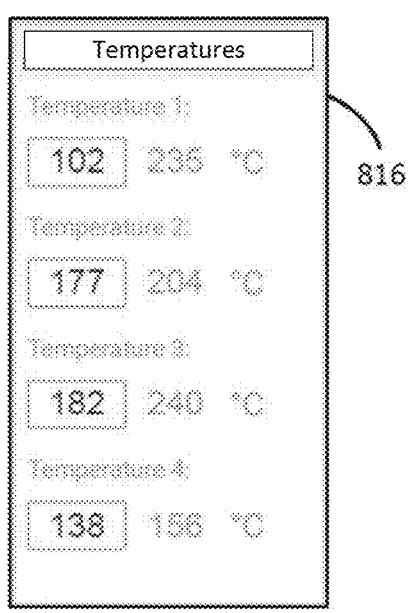

FIG. 11C illustrates the type 3 tile 816. The tile 816 may comprise a parameter list. For each of a series of temperature entries (e.g., Temperature 1, Temperature 2, etc.), an editable text field for a temperature setpoint and a non-editable temperature value are presented. The non-editable temperature value may indicate a current temperature setpoint or, alternatively, a measured actual temperature. Each temperature entry may correspond with a temperature channel (e.g., a heater or temperature measurement point) represented as a sub-tile in the tile 812. Thus, a user may set or adjust multiple temperature setpoints for the melter unit at one time.

FIG. 11D illustrates the tile 818. The tile 818 may be a type 4 tile or, alternatively, may be a type 3 tile. The tile 818 may relate to a temperature channel, such as a heater. The tile 818 is associated with "Temperature 1," which may be the same "Temperature 1" referred to in the tile 816. The tile 818 indicates a shutdown temperature, a fault over-temperature, a warning over-temperature, a setback temperature, a warning under-temperature, and a fault under-temperature. As shown in FIG. 11D, each of the noted temperature values are not editable. Alternatively, one or more of the temperature values may be editable. Whether the temperature values are editable may depend on user and/or zone permissions.

Figure 11E:
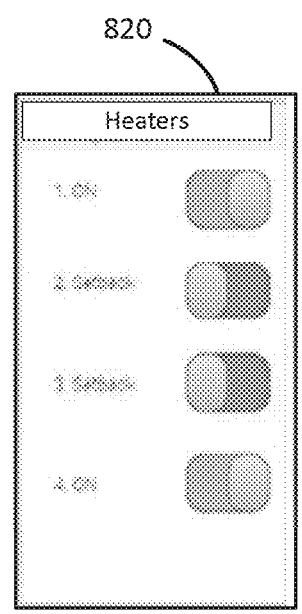

FIG. 11E illustrates a tile 820. The tile 820 may be a type 5 tile or, alternatively, the tile 820 may be considered a type 3 tile. The tile 820 comprises a plurality of interactive slide elements configured to set the operational state of a corresponding heater (indicated by 1, 2, etc.). The slide element may be used to set the operational state of a heater as "ON" or "Setback," The selected operational state is also indicated for each heater.

FIGS. 12A-C relate to pump operations of a selected melter unit 702. FIG. 12A illustrates a type 1 tile 822. Activation of the tile 822 may facilitate access to settings, operating parameters, status, or measured values associated with pump operations.

FIG. 12B illustrates a type 2 tile 824. The tile 824 may be displayed responsive to activation of the tile 822. The tile 824 comprises a plurality of pump sub-tiles. Each pump sub-tile may indicate a setpoint (e.g., motor rpm), an actual value (e.g., motor RPM or percentage of the setpoint), and a name of the associated pump. The upper portion of each pump sub-tile comprises a color-coded circle element that indicates the status of the associated pump. The upper portion of each pump sub-tile further comprises either a hand icon or an upper-case "A" to indicate whether the pump is operating in a manual mode or an automatic mode, respectively. Additionally or alternatively, the sub-tiles of the tile 824 may correspond to pump motors, some of which may be pump motors for the same pump.

FIG. 12B further illustrates a dialog box or window 826 that is displayed responsive to activation of one of the pump sub-tiles of the tile 824. The window 826 may be considered a secondary type 2 tile of the tile 824. The window 826 may be considered part of the tile 812. The window 826 comprises an interactive slide element to turn the associated pump on or off. The window 826 comprises a paired hand icon element and an upper-case "A" element. Selection of either of the hand icon element or the upper-case "A" element sets the pump to operate in manual mode or automatic mode, respectively. The window 826 comprises editable text fields to enter a setpoint and a name. The window 826 indicates an actual value ("89%") associated with pump operation. The window 826 further indicates measured pressure values ("Sensor A: 3 bar" and "Pressure Sensor B: 7 bar"). The window 826 comprises a visualization of the activated pump sub-tile as it is displayed in the tile 824. The window 826 comprises a "CLOSE" button to close the window 826. The window 826 comprises an arrow element. Activation of the arrow element may cause display of a parameter list associated with pumps of the melter unit 702. Activation of the arrow element may additionally or alternatively cause display of a tile 828 and/or a tile 830 of FIG. 12C.

FIG. 12C illustrates the tile 828 and the tile 830. One or both of the tile 828 and the tile 830 may be considered type 3 tiles. The tile 828 comprises a plurality of pump sub-tiles. Each pump sub-tile of the tile 828 comprises a name of the associated pump and a color-coded element that indicates that status of the associated pump. The tile 830 comprises a plurality of pairs of a pump name and a slidable, color-coded element. A slidable element may be interacted with to turn the associated pump on or off. The color of a slidable element may indicate the status of the associated pump, such as motor off, motor enabling, or motor running. The tile 830 may be displayed responsive to activation of the tile 828 and/or activation of a pump sub-tile of the tile 828.

FIGS. 13A-C relate to pattern control associated with the selected melter unit 702. For example, applicators receiving melted adhesive from the melter unit 702 may dispense the melted adhesive according to a selected pattern. FIG. 13A illustrates a type 1 tile 832. Activation of the tile 832 may facilitate access to settings, operating parameters, status, or measured values associated with pattern control. The tile 832 may comprise an icon indicating a selected dispensing pattern.

FIG. 13B illustrates a type 2 tile 834. The tile 834 may be displayed responsive to activation of the tile 832. The tile 834 comprises a plurality of selectable pattern sub-tiles, each corresponding to a dispensing pattern. Selection of one of the pattern sub-tiles may set the applicators associated with the melter unit to dispense melted adhesive according to the dispensing pattern corresponding to the selected pattern sub-tile. Activation of a pattern sub-tile may additionally or alternatively cause display of a tile 836 of FIG. 13C.

FIG. 13C illustrates the tile 836. The tile 836 may be considered a type 3 tile. The tile 836 may be displayed responsive to activation of a pattern sub-tile of the tile 834. The tile 836 comprises an icon at the upper-left corner indicated the dispensing pattern of the activated pattern sub-tile. At the upper-right corner, a plurality of elements are presented to select a different dispensing pattern than the one activated to cause display of the tile 836. The tile 836 comprises editable text fields for opening time, closing time, offset, delay, and duration. The tile 836 comprises a "CLOSE" button to close the tile 836. The tile 836 comprises an arrow element. Activation of the arrow element may cause display of a parameter list associated with pattern control.

Figure 14B:
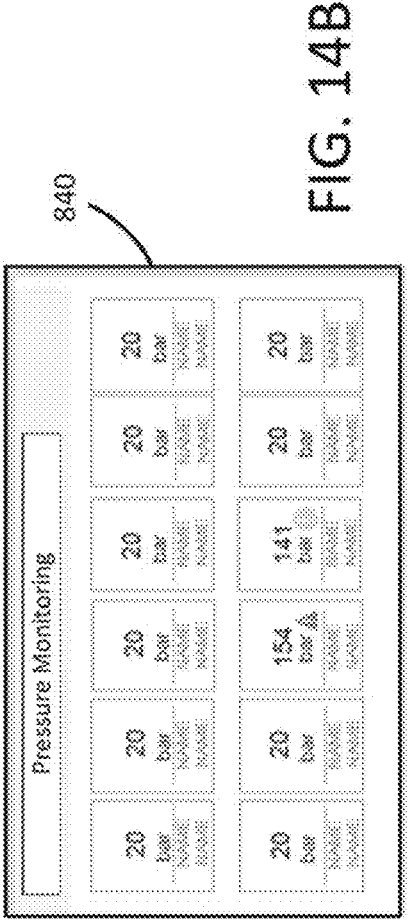
Figure 14D:
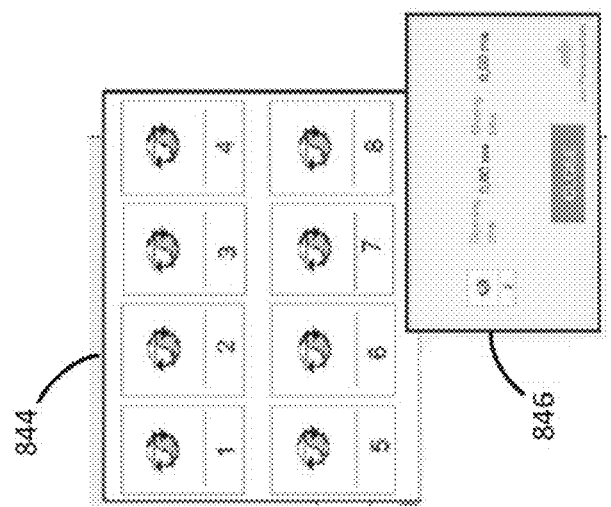
Figure 14A:
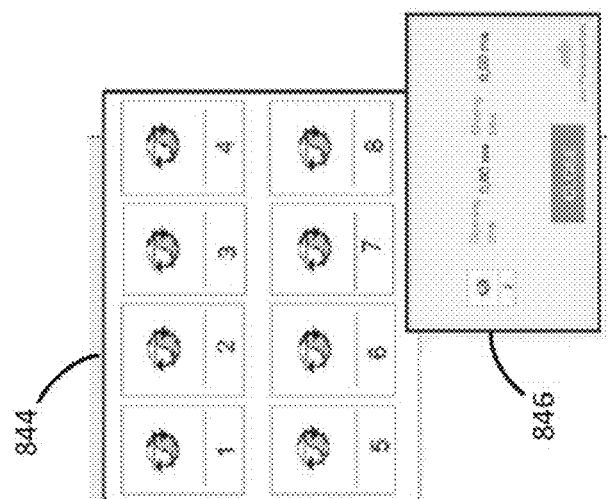

FIGS. 14A-B relate to pressure monitoring. FIG. 14A illustrates a type 1 tile 838. Activation of the tile 838 may facilitate access to settings, operating parameters, status, or measured values associated with pressure monitoring. FIG. 14B illustrates a type 2 tile 840 comprising a plurality of pressure sub-tiles. Each pressure sub-tile indicates a measured actual pressure (e.g., 20 bar, 154 bar, or 141 bar) and a name associated with the pressure sub-tile. A fault or warning icon may be displayed on a pressure sub-tile if pre-set pressure thresholds are exceeded.

Figure 14C:
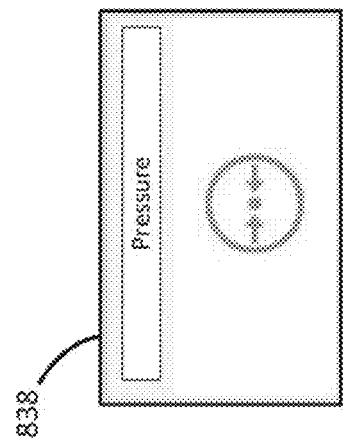

FIGS. 14C-D relate to a needle stroke detection system and/or needle stroke generally. Needle stroke refers to a needle or pin of an applicator (e.g., within a dispensing module of an application) that is actuated to cause a droplet of liquid to be dispensed from the applicator (e.g., from a dispensing module). FIG. 14C illustrates a type 1 tile 842. Activation of the tile 842 may facilitate access to settings, operating parameters, status, or measured values associated with a needle stroke detection system and/or needle stroke generally. The tile 842 may comprise an icon to indicate a status or parameter relating to needle stroke. FIG. 14D illustrates a type 2 tile 844 comprising a plurality of needle stroke sub-tiles. The tile 844 may be displayed responsive to activation of the tile 842. Each needle stroke sub-tile may be associated with an applicator or individual dispensing module of an applicator. Activation of a needle stroke sub-tile may cause display of a dialog box or window 846. The window 846 may be considered a secondary tile of the tile 844. The window 846 comprises text fields for opening time and closing times. The text fields may be editable. The window 846 comprises a "CLOSE" button to close the window 846. The window 846 comprises an arrow element. Activation of the arrow element may cause display of a parameter list associated with needle stroke or a needle stroke detection system.

Figure 15C:
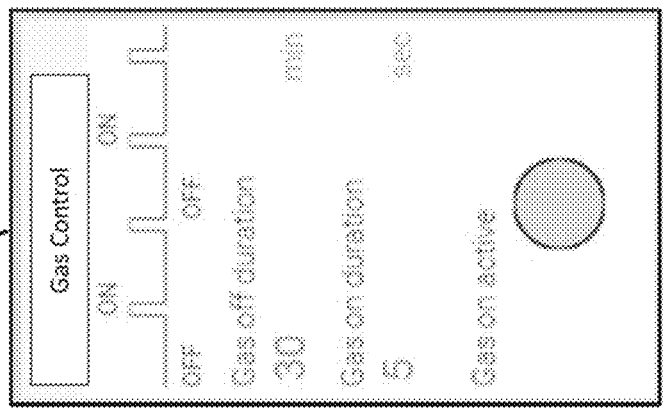
Figure 15A:
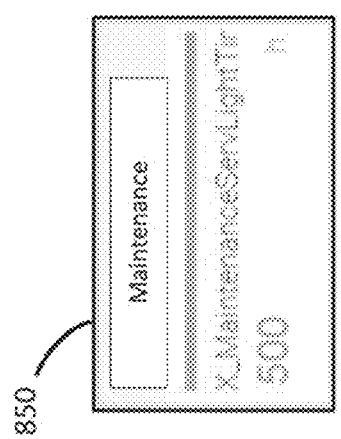
Figure 15B:
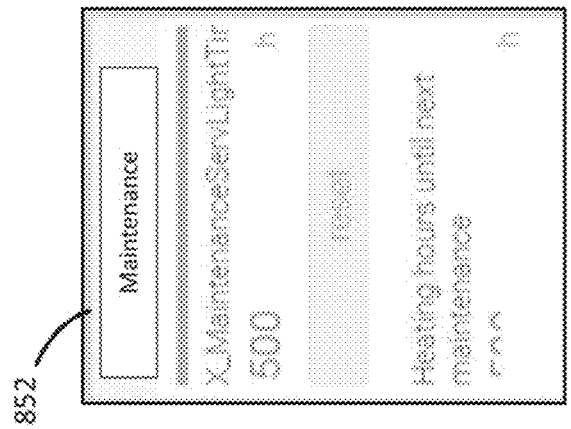

FIGS. 15A-B relate to melter unit maintenance. FIG. 15A illustrates a tile 850. The tile 850 may be a type 1 tile. Activation of the tile 850 may facilitate access to settings, operating parameters, status, or measured values associated with a melter unit maintenance. FIG. 15B illustrates a tile 852. The tile 852 may be a type 2 tile and may be displayed responsive to activation of the tile 850. The tile 852 comprises text fields for a service light time ("500 h") and heating hours until next maintenance ("500 h"). The text fields may be editable. The tile 852 further comprises an interactive element to reset the maintenance service light time and/or the heating hours until next maintenance.

FIG. 15C illustrates a tile 854 relating to inert gas supplied to the melter unit to reduce adhesive charring or other degradation. The tile 854 comprises a graph indicating ON/OFF cycle times. The tile 854 further comprises text fields for "gas off duration" and "gas on duration." The text fields may be editable. The tile 854 further comprises an interactive element for "gas on active."

Figure 16B:
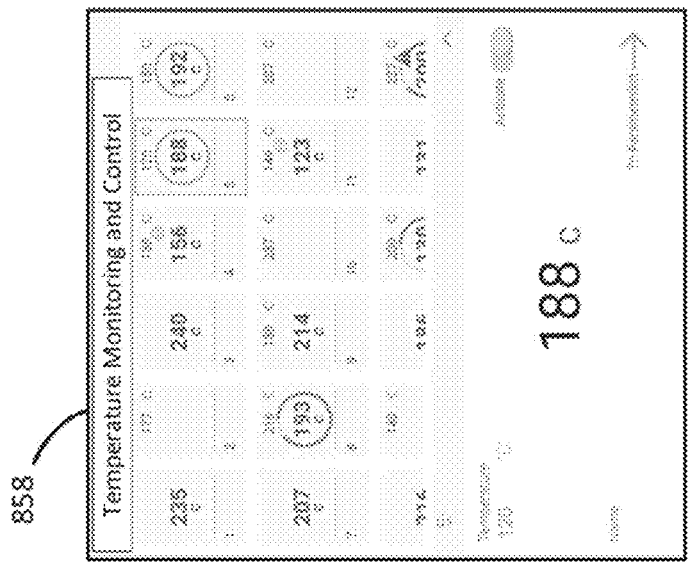
Figure 16A:
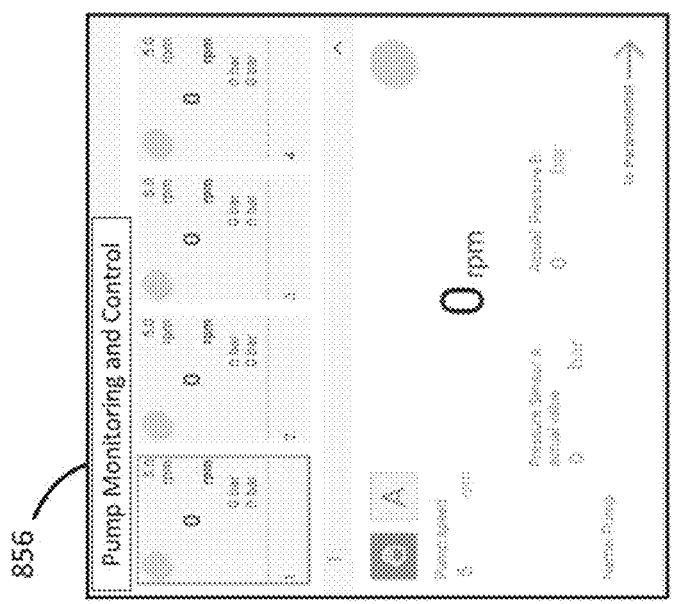

FIG. 16A illustrates a type 2 tile 856 relating to pump operations. The tile 856 may be an alternative embodiment for the tile 824 and window 826 of FIG. 12B. Rather than open the window 826, as is the case with the tile 824, the tile 856 comprises a lower section that includes many of the features of the window 826. For example, the lower section of the tile 856 comprises a hand icon element and an upper-case "A" element to select between manual and automatic modes. The lower section of the tile 856 comprises an icon to indicate the status of the associated pump. The lower section of the tile 856 indicates an actual value ("0 rpm") associated with pump operation. The window 826 further indicates measured pressure values ("Sensor A: 0 bar" and "Pressure Sensor B: 0 bar"). The lower section may be displayed when a pump is selected in the upper section of the tile 856 and may be hidden when no pump is selected in the upper section. The lower section may be also selectively hidden by a user.

FIG. 16B illustrates a type 2 tile 858 relating to temperatures. The tile 858 may be an alternative embodiment for the tile 812 and window 814 of FIG. 11B. Rather than open the window 814, as is the case with the tile 812, the tile 858 comprises a lower section that includes many of the features of the window 826. For example, the lower section of the tile 858 indicates a temperature setpoint, a measured actual temperature, and a name of the associated temperature channel (e.g., heater). The lower section comprises an interactive slide element to activate or deactivate the associated heater. The lower section may be displayed when a temperature channel is selected in the upper section of the tile 858 and may be hidden when no temperature channel is selected in the upper section. The lower section may be also selectively hidden by a user.

Figure 17B:
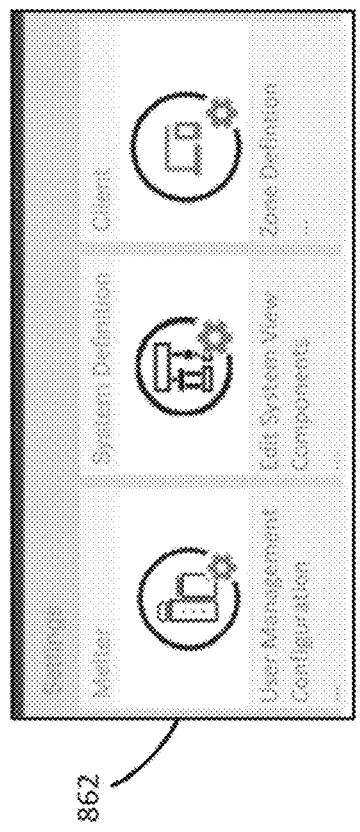
Figure 17C:
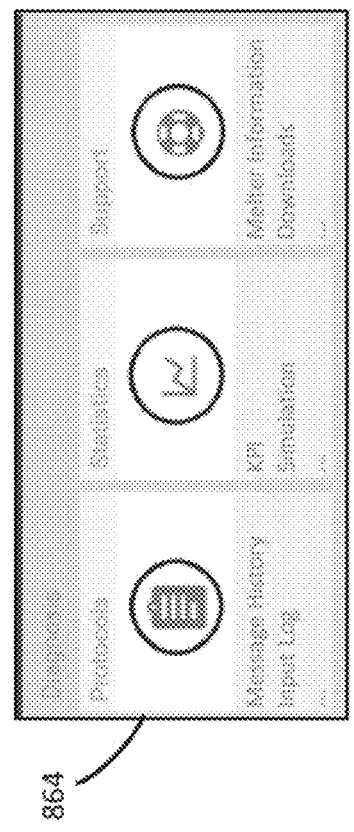
Figure 17A:
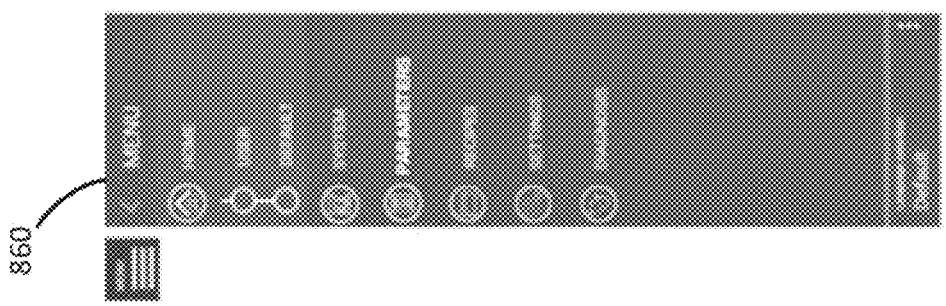

FIG. 17A illustrates a menu 860 that is selectively displayed responsive to activation of the "Menu" element in the status area 730 of the user interface 704. The menu 860 provides access to additional information that may be viewed and/or modified by the user. Information may include, but is not limited to, selection of individual users who have access to the system 700 (or to individual melter units 702), status of the system 700, parameters of the melter units 702, preset control programs or recipes, device settings, system and/or device diagnostics, and other options that may be desirable to access from the control device 710. Referring to FIGS. 17B-C, the menu 860 may include a settings portion 862 via which various aspects of the user interface 704 and/or system 700 may be set or adjusted. For example, the settings portion 862 may provide access to melter configuration settings, system component settings, and client zone definition settings. The menu 860 further includes a diagnosis portion 864 providing access to diagnosis functions relating to protocols, statistics, and support.

The system 700 may further include a geographical control to increase security and safety. The geographical controls discussed in relation to the system 700 are equally applicable to the system 200 of FIG. 2 and the system 300 of FIG. 3. A user may use a stand-alone remote control device 710 to monitor and/or modify parameters of the system 700. In some aspects, it may be desirable to prevent a user from accessing some or all of the functionality of the control device 710 as described throughout this application. When a user is in physical proximity of the system 700, the user can monitor the conditions of the system and make informed decisions related to the displayed information. However, when a user is remote (e.g., far away from the system 700 or outside of direct line of sight from the system 700 or one or more of the melter units 702 that make up the system 700), the user may not fully comprehend the state of the one or more melter units 702. As such, it may be advantageous to preclude the user from modifying certain parameters of the system 700.

Figure 18:
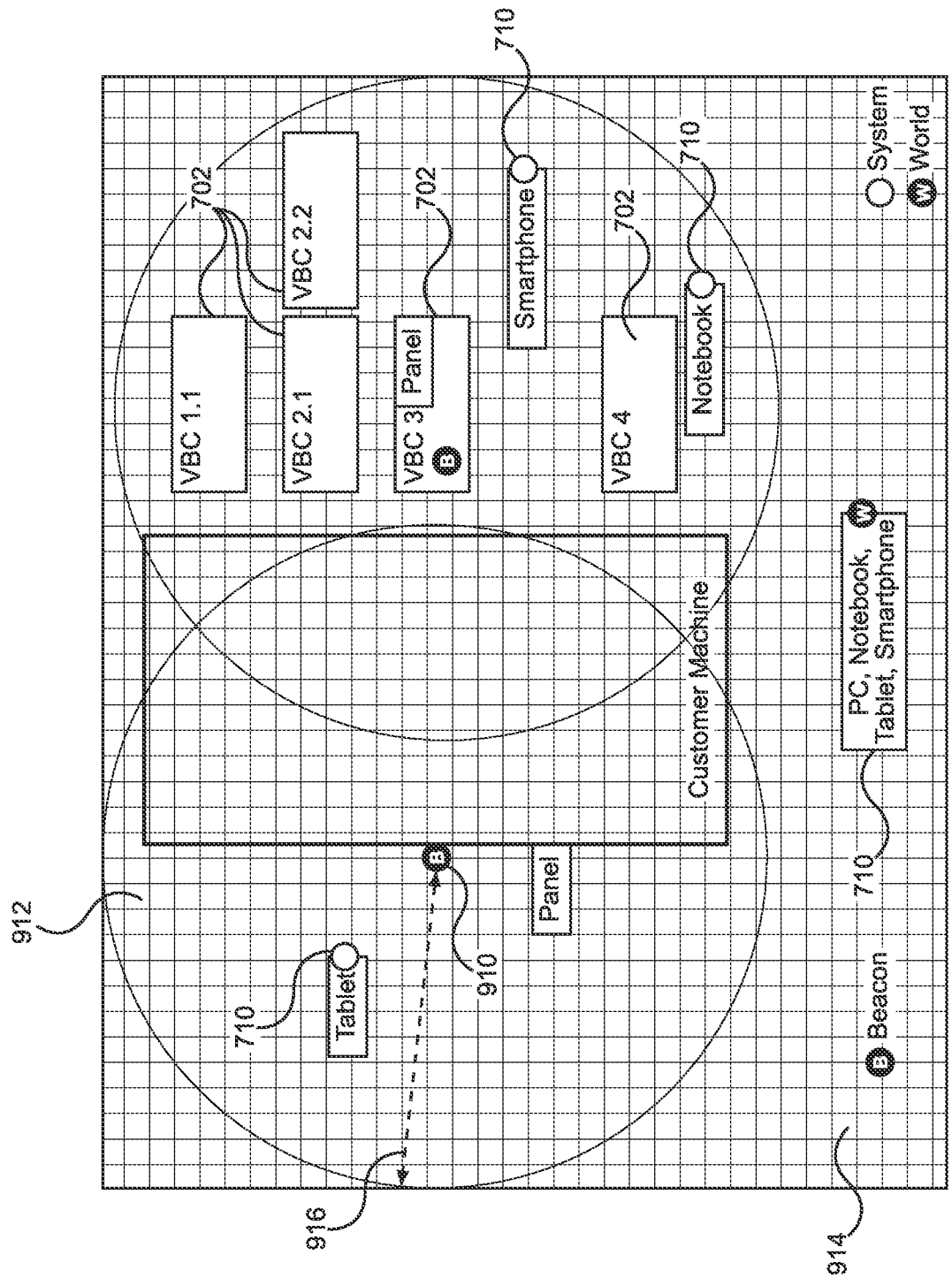
FIG. 18 illustrates an example diagram of a geospatial composite system configuration.

Referring to FIG. 18, a geographical locating function (e.g., geofencing) may be utilized to establish a permissible zone 912, in which a user has access to some or all of the capabilities of the system 700 or any of the individual melter units 702 within the system 700, and a non-permissible zone 914, in which the user is precluded from accessing and/or modifying some or all of the parameters of the system 700.

A geographical beacon 910 maybe disposed in the system 700, for example, on one or more of the melter units 702. The beacon 910 may be realized by the wireless interface 748 of the melter unit 702 shown in FIG. 8, for example. It will be understood, however, that multiple beacons 910 may be used, and that the beacon 910 may be disposed elsewhere within or adjacent to the system 700.

The beacon 910 may be a WLAN-access point configured to send and receive wireless signals. The beacon 910 may be physically connected via a cable to the control device 710. One or more mobile devices can communicate with that beacon 910 by sending and receiving signals to and from the WLAN-access point via WLAN and/or Bluetooth.

The permissible zone 912 maybe defined by a predetermined radial distance 916 from the beacon 910. If the control device 710 is within the permissible zone 912, the user may have access to view and/or modify a permissible set of parameters. If, however, the control device 710 is outside of the permissible zone 912, the user may be precluded from viewing and/or modifying part or all of the permissible set of parameters.

The control device 710 may include a mobile phone, a notebook computer, and a tablet. It will be understood that other devices may comprise a suitable control device 710, such as a smart watch, a personal digital assistant, a desktop computer, or another digital device that can have the capabilities described herein.

In some aspects, when the control device 710 is within the permissible zone 912, the user may view and modify all parameters or other control data associated with the system 700, and when the control device 710 is outside of the permissible zone 912, the user may only view the parameters or other control data but may not modify them. For example, the display of control data may be allowed or restricted based on the zone in which the control device 710 is located. Additionally or alternatively, modification of control data may be allowed or restricted based on the zone in which the control device is located. The specific parameters or other control data that may be viewed and/or modified within and outside of the permissible zone 912 may depend on the credentials of the user, the distance away from the beacon 910, the status of the melter units 702, or on other preset parameters of the system 700.

Figure 19A:
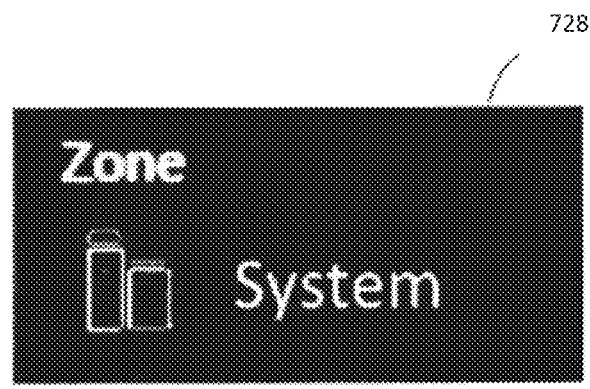
FIGS. 19A and 19B illustrate example diagrams of user interface elements.
Figure 19B:

The particular zone in which the control device 710 is disposed may be depicted by the zone element 728 on the user interface 704 shown in FIGS. 9A-B. FIGS. 19A-B each illustrate the zone element 728 according one of several possible modes. In FIG. 19A, the zone element 728 shows that the control device 710 is operating under a "System" mode. The System mode may reflect that the control device 710 is located within a permissible zone 912. Thus, the control device 710 may be then used to view and modify an expanded set of parameters and settings. In FIG. 19B, the zone element 728 shows that the control device 710 is operating under a "World" mode. The World mode may reflect that the control device 710 is located outside of a permissible zone 912 (e.g., within a non-permissible zone 914). Thus, the control device 710 may be then used to view only certain parameters and/or modify only a limited number of parameters or settings.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of communicating control data between a plurality of components of a liquid dispensing system, the method comprising:
   implementing a first component of a liquid dispensing system with a controller responsive to a composite controller and the composite controller is configured to coordinate components of the liquid dispensing system;
   publishing, by the controller of the first component of the liquid dispensing system, a control data message to the composite controller associated with the liquid dispensing system;
   based on a classification of the control data message, determining that a second component of the liquid dispensing system is a subscriber for the control data message; and
   transmitting, by the composite controller, the control data message to the controller of the second component of the liquid dispensing system.

2. The method of claim 1, wherein determining that the second component of the liquid dispensing system is a subscriber for the control data message is further based on a subscriber profile associated with the second component of the liquid dispensing system.

3. The method of claim 2, wherein the subscriber profile indicates a subscription to control data messages associated with the classification of the control data message.

4. The method of claim 2, wherein the subscriber profile indicates a subscription to control data messages published by select components of the liquid dispensing systems.

5. The method of claim 2, wherein the subscriber profile indicates a subscription to control data messages comprising control data that exceeds a threshold value, is below a threshold value, is within a threshold value range, or is outside of a threshold value range.

6. The method of claim 2, wherein the subscriber profile is defined, at least in part, by the controller of the second component of the liquid dispensing system.

7. The method of claim 1, wherein the controller of the first component of the liquid dispensing system comprises a first publisher server and a first subscriber client and the controller of the second component of the liquid dispensing system comprises a second publisher server and a second subscriber client.

8. The method of claim 7, wherein the first publisher server publishes the control data message to the composite controller.

9. The method of claim 7, wherein the second subscriber client receives the control data message.

10. The method of claim 1, wherein the control data message comprises control data relating to an operating parameter of the first component of the liquid dispensing system, the operating parameter comprising at least one of a temperature setpoint, a temperature control loop settings, a control loop type, a pump speed, a pump motor speed, a heater duty cycle, or applicator cycle rate.

11. The method of claim 1, wherein the control data message comprises control data relating to data measured by the first component of the liquid dispensing system, the data measured by the first component comprising at least one of a liquid temperature, a liquid flow rate, a liquid flow volume, or a liquid pressure.

12. The method of claim 1, wherein the control data message comprises control data relating to hardware configuration data for the first component, the hardware configuration data comprising at least one of a number of pumps, a pump type, a liquid holding capacity, a number of hose outlets, a power capacity, a number of control interfaces, a unit weight, unit external dimensions, flow throughput, or melt rate.

13. The method of claim 1, wherein a third component of the liquid dispensing system comprises the composite controller.

14. The method of claim 13, wherein the third component comprises a control panel and the control panel is configured to display at least a portion of the control data indicated in the control data message.

15. The method of claim 1, wherein a cloud server comprises the composite controller, the cloud server being located remote from a premises housing the liquid dispensing system.

16. The method of claim 1, further comprising:
   accessing, by a computing device and via the composite controller, control data indicated in the control data message.

17. The method of claim 1, wherein the first component defines, at least in part, the classification of the control data message.

18. The method of claim 1, wherein the classification of the control data message is based on a type of component, a type of operating parameter, a type of measured data, or a type of hardware configuration associated with the control data message.

19. The method of claim 1, further comprising:
   displaying control data relating to at least one component of the liquid dispensing system via a user interface associated with the liquid dispensing system.

20. The method of claim 19, wherein the user interface is configured to enable adjustment of at least one operating parameter of the liquid dispensing system based on user input to the user interface.

21. The method of claim 19, wherein the user interface comprises:
   a production line element representing a production line associated with the first component and the second component, and
   a plurality of system elements, each system element representing a component of the liquid dispensing system.

22. The method of claim 21, wherein the production line element and the plurality of system elements are arranged on the user interface to reflect relative positions at an associated premises of the production line and components represented by the plurality of system elements.

23. The method of claim 21, wherein at least one system element of the plurality of system elements comprises an operation status element indicating an operation status of a represented component or a fill level element indicating a fill level associated with the represented component.

24. The method of claim 21, wherein activation of a component causes display of an interface element indicating control data associated with the component represented by the system element.

25. The method of claim 19, wherein a third component of the plurality of components is configured to output the user interface.

26. The method of claim 25, wherein the third component is configured with a control panel, the control panel being configured to output the user interface.

27. The method of claim 19, wherein a computing device associated with the plurality of liquid dispensing system is configured to output the user interface.

28. A method for adding a liquid dispensing system component to a composite system comprising a composite controller and a plurality of liquid dispensing systems, the method comprising:
    implementing a composite controller configured to coordinate components of a liquid dispensing system;
    detecting, by the composite controller, a signal from the liquid dispensing system component;
    requesting, responsive to detecting the signal, configuration data associated with the liquid dispensing system component;
    receiving the configuration data from the liquid dispensing system component; and
    based on the configuration data, adding the liquid dispensing system component to the composite system by the composite controller.

29. The method of claim 28, wherein the liquid dispensing system component comprises a melter unit of a liquid dispensing system.

30. The method of claim 28, wherein the composite controller is configured to cause output of a user interface comprising a plurality of system elements and a production line element representing a production line associated with the composite system, each system element of the plurality of system elements representing a liquid dispensing system of the composite system.

31. The method of claim 30, further comprising:
    responsive to adding the liquid dispensing system component to the composite system, generating a system element representing the liquid dispensing system component on the user interface,
    wherein an arrangement on the user interface of the plurality of system elements, the production line element, and the system element representing the liquid dispensing system component reflects a relative positioning at a premises of the plurality of liquid dispensing systems, the production line, and the liquid dispensing system component.

32. The method of claim 30, wherein activation of a system element of the plurality of system elements causes display of an interface element indicating control data associated with the liquid dispensing system represented by the system element.

33. A device for controlling a plurality of components of a liquid dispensing system, the device comprising:
    a screen configured to output a user interface, the user interface comprising an interface element configured for selection of a component of the plurality of components and a plurality of simultaneously-displayed control tiles associated with a selected component; and
    a communications interface in communication with a composite controller, the communications interface configured to receive control data from the selected component, at least a portion of the control data being displayed via the plurality of simultaneously-displayed control tiles,
    wherein the composite controller coordinates components of the liquid dispensing system.

34. The device of claim 33, wherein the selected component comprises a melter unit.

35. The device of claim 33, wherein the interface element configured for selection of a component comprises a plurality of component tiles corresponding to the plurality of components, and wherein selection of a component of the plurality of components comprises activation of a corresponding component tile of the plurality of component tiles.

36. The device of claim 35, wherein a component tile of the plurality of component tiles is configured to display at least one of an operation mode of a corresponding component or a status of an operating parameter associated with the corresponding component.

37. The device of claim 33, wherein activation of a first control tile of the plurality of simultaneously-displayed control tiles causes the user interface to display a second control tile associated, via a common functional aspect of the liquid dispensing system, with an activated control tile.

38. The device of claim 37, wherein a functional aspect of the liquid dispensing system is associated with at least one of temperature, a heater, a pump, a pump motor, needle stroke, dispensing pattern, liquid fill level, liquid pressure, and maintenance.

39. The device of claim 37, wherein the first control tile is configured to display an operating parameter status associated with the common functional aspect and the second control tile is configured to receive a user input to modify an operating parameter associated with the common functional aspect.

40. A method for controlling a liquid dispensing system, the method comprising:
    implementing a composite controller configured to coordinate components of a liquid dispensing system;
    determining with the composite controller a location of a control device configured to control, at least in part, the liquid dispensing system, wherein the location of the control device is relative to a component of the liquid dispensing system;
    outputting, by the control device, a user interface configured to display control data associated with the liquid dispensing system; and
    managing, based on the location of the control device, at least one of a display of control data via the user interface and a modification of the control data via the user interface.

41. The method of claim 40, wherein managing at least one of the display of the control data and the modification of the control data comprises: displaying a first portion of the control data on the user interface, and preventing display of a second portion of the control data on the user interface.

42. The method of claim 40, wherein managing at least one of the display of the control data and the modification of the control data comprises: receiving user input via the user interface to modify a first portion of the control data, and preventing modification of a second portion of the control data.

43. The method of claim 42, further comprising:
sending, by the control device, a modified first portion of the control data to the component of the liquid dispensing system, wherein the first portion of the control data comprises an operating parameter of the component of the liquid dispensing system.

44. The method of claim 40, further comprising:
based on the location of the control device, determining an operating mode of the user interface, wherein managing at least one of the display of the control data and the modification of the control data is further based on the operating mode, and wherein the user interface is configured to display an indication of the operating mode.

45. A control system for a liquid dispensing system, the control system comprising:
a control device configured to output a user interface, the user interface configured to display control data associated with a component of the liquid dispensing system; and
a wireless beacon device configured to communicate and interface between a composite controller and the control device,
wherein the control device is configured to manage, based on a location of the control device relative to the wireless beacon device, at least one of a display of the control data via the user interface and a modification of the control data via the user interface, and
wherein the composite controller coordinates components of the liquid dispensing system.

* * * * *